(12) United States Patent
Muijzert et al.

(10) Patent No.: US 12,681,201 B2
(45) Date of Patent: Jul. 14, 2026

(54) MARINE SEISMIC IMAGING

(71) Applicant: Schlumberger Technology Corporation, Sugar Land, TX (US)

(72) Inventors: Everhard Muijzert, Cambridge (GB); Claudio Bagaini, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 506 days.

(21) Appl. No.: 18/261,540

(22) PCT Filed: Jan. 13, 2022

(86) PCT No.: PCT/US2022/070180
§ 371 (c)(1),
(2) Date: Jul. 14, 2023

(87) PCT Pub. No.: WO2022/155663
PCT Pub. Date: Jul. 21, 2022

(65) Prior Publication Data
US 2024/0094421 A1 Mar. 21, 2024

Related U.S. Application Data

(60) Provisional application No. 63/137,572, filed on Jan. 14, 2021.

(51) Int. Cl.
| | |
|---|---|
| *G01V 1/38* | (2006.01) |
| *G01V 1/08* | (2006.01) |
| *G01V 1/30* | (2006.01) |

(52) U.S. Cl.
CPC .............. *G01V 1/3852* (2013.01); *G01V 1/08* (2013.01); *G01V 1/305* (2013.01); *G01V 1/3808* (2013.01); *G01V 2210/74* (2013.01)

(58) Field of Classification Search
CPC ........ G01V 1/3852; G01V 1/08; G01V 1/305; G01V 1/3808; G01V 2210/74;
(Continued)

(56) References Cited

U.S. PATENT DOCUMENTS

| | | | |
|---|---|---|---|
| 7,450,649 B2 | 11/2008 | Gregorius | |
| 10,048,395 B2 * | 8/2018 | Goujon ................... | G01V 1/162 |

(Continued)

FOREIGN PATENT DOCUMENTS

| | | | | |
|---|---|---|---|---|
| AU | 2010326053 A1 * | 5/2012 | ............... | G01V 1/38 |
| AU | 2022208503 A1 * | 7/2023 | ............. | G01V 1/366 |

(Continued)

OTHER PUBLICATIONS

Amini, A. et al., "Joint inversion of water velocity and node position for ocean-bottom node data", SEG Technical Program Expanded Abstracts 2016, Sep. 1, 2016, 5 pages.
(Continued)

*Primary Examiner* — Daniel Pihulic
(74) *Attorney, Agent, or Firm* — Kyle R. Miiller

(57) ABSTRACT

A method can include receiving seismic survey data of a subsurface environment from a seismic survey utilizing water bed receivers, where each of the receivers includes a clock; assessing one or more clock calibration criteria; based on the assessing, selecting a clock drift processor for processing at least a portion of the seismic survey data from a plurality of different clock drift processors; using at least the clock drift processor, performing a simultaneous inversion for values of model-based parameters; and, using at least a portion of the values, generating processed seismic survey data that represents one or more geological interfaces in the subsurface environment.

19 Claims, 22 Drawing Sheets

(58) Field of Classification Search

CPC ......... G01V 2200/12; G01V 2210/679; G01V
1/303; G01V 1/3835; G01V 1/366; G01V
1/40; G01V 2210/1212; G01V 2210/127;
G01V 1/38

See application file for complete search history.

(56) References Cited

U.S. PATENT DOCUMENTS

| | | | | |
|---|---|---|---|---|
| 10,054,706 | B2 | 8/2018 | Noss | |
| 10,365,388 | B2 * | 7/2019 | Westerdahl | ............ G01V 1/364 |
| 10,663,610 | B2 * | 5/2020 | Craft | ......................... G01V 1/38 |
| 11,733,418 | B2 * | 8/2023 | Westerdahl | .............. G01V 1/38 |
| | | | | 367/12 |
| 2003/0117893 | A1 | 6/2003 | Bary | |
| 2014/0219053 | A1 * | 8/2014 | Goujon | .................. G01V 1/181 |
| | | | | 367/37 |
| 2015/0168576 | A1 * | 6/2015 | Craft | ......................... G01V 1/38 |
| | | | | 702/14 |
| 2016/0178772 | A1 | 6/2016 | Carter | |
| 2017/0075008 | A1 * | 3/2017 | Westerdahl | ............ G01V 1/364 |
| 2017/0075030 | A1 | 3/2017 | Wheelock | |
| 2019/0146110 | A1 * | 5/2019 | Hovland | .................. G01V 1/18 |
| | | | | 367/50 |
| 2019/0250297 | A1 * | 8/2019 | Westerdahl | .............. G01V 1/38 |
| 2020/0408942 | A1 | 12/2020 | Udengaard | |
| 2021/0041586 | A1 * | 2/2021 | Aanensen | .............. G01V 1/247 |
| 2024/0094421 | A1 * | 3/2024 | Muijzert | ................ G01V 1/303 |

FOREIGN PATENT DOCUMENTS

| | | | | | |
|---|---|---|---|---|---|
| CA | 3208413 | A1 | * | 7/2022 | .......... G01V 1/3852 |
| CA | 2947966 | C | * | 2/2024 | ............ G01V 1/364 |
| CN | 112285775 | A | * | 1/2021 | .......... G01V 1/3808 |
| CN | 116762023 | A | * | 9/2023 | ............ G01V 1/366 |
| EP | 4184221 | A2 | * | 5/2023 | ............... G01V 1/28 |
| EP | 3140678 | B1 | * | 7/2023 | ............ G01V 1/364 |
| GB | 2525896 | A | * | 11/2015 | ............... G01V 1/38 |
| GB | 2546145 | A | * | 7/2017 | ............... G01V 1/38 |
| WO | WO-2015169860 | A2 | * | 11/2015 | ............... G01V 1/38 |
| WO | WO-2017116675 | A1 | * | 7/2017 | ............... G01V 1/36 |
| WO | WO-2022155663 | A1 | * | 7/2022 | ............... G01V 1/08 |

OTHER PUBLICATIONS

Advocate, D. M. et al., "An empirical time-depth model for calculating water depth northwest Gulf of Mexico", Geo-Marine Letters, 1993, 13, pp. 207-211.

Bagaini, C., "Performance of time delay estimators", Geophysics, Jul. 7, 2005, vol. 70, pp. V109-V120.

Beaudoin, G. J., "First Wide-azimuth Time-lapse Seismic Acquisition Using Ocean Bottom Seismic Nodes at Atlantis field—Gulf of Mexico", EAGE 2010, B029, 5 pages.

Docherty, P.C. et al., "Ambiguities in Direct Arrival Time Inversion of Ocean Bottom Nodes", 2012 74th EAGE Conference Exhibition, Extended Abstracts, P131, 5 pages.

Mackay, S. et al., "The impact of water-velocity variations on deepwater seismic data," The Leading Edge, 2003, 22 (4), pp. 344-350.

Olofsson, B. et al., "Ensuring correct clock timing in ocean bottom node acquisition", 80th Annual International Meeting, SEG, Expanded Abstracts, 2010, pp. 172-176.

Paige, C.C. et al., "LSQR: An algorithm for sparse linear equations and sparse least squares", ACM Transactions on Mathematical Software, 1982, 8(1), pp. 43-71.

Oshida, A. et al., "A new method for determining OBS positions for crustal structure studies, using airgun shots and precise bathymetric data", Exploration Geophysics, 2008, 39(1), 12 pages.

Udengaard, C. R. et al., "Analysis of Water col. Complexity in OBN Data", 74th EAGE Conference Exhibition, 2012, B046, 5 pages.

Vandecar, J.C. et al., , Determination of teleseismic relative phase arrival times using multi-channel cross-correlation and least squares, Bulletin of the Seismological Society of America, 1990, 80, 150-169.

Search Report and Written Opinion of International Patent Application No. PCT/US2022/070180 dated Mar. 18, 2022, 11 pages.

Search Report of European Patent Application No. 22740256.7 dated Oct. 25, 2024, 8 pages.

* cited by examiner

Method <u>350</u>

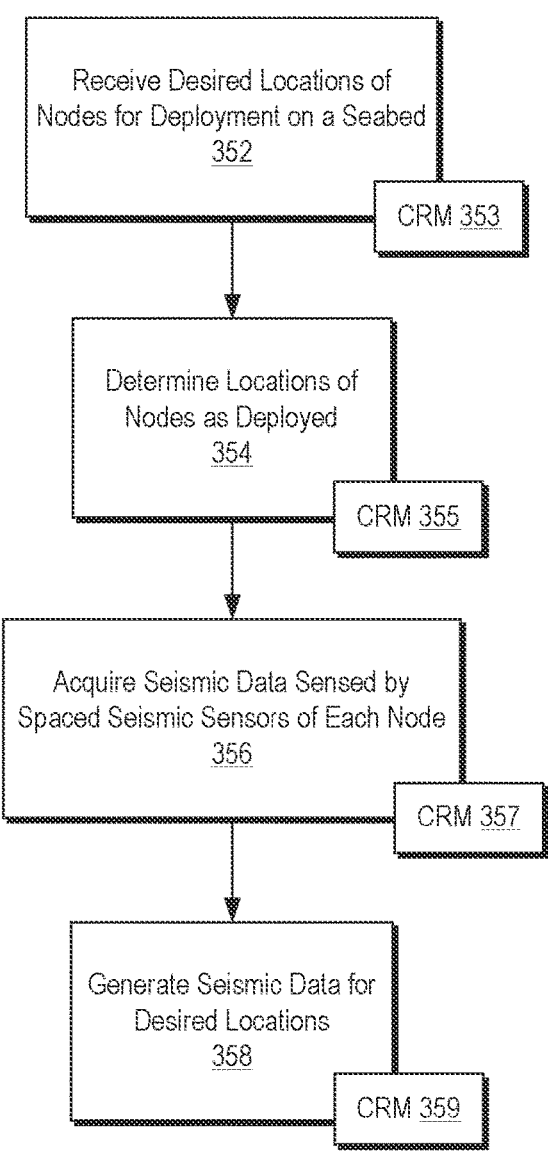

Receive Desired Locations of
Nodes for Deployment on a Seabed
<u>352</u>

CRM <u>353</u>

Determine Locations of
Nodes as Deployed
<u>354</u>

CRM <u>355</u>

Acquire Seismic Data Sensed by
Spaced Seismic Sensors of Each Node
<u>356</u>

CRM <u>357</u>

Generate Seismic Data for
Desired Locations
<u>358</u>

CRM <u>359</u>

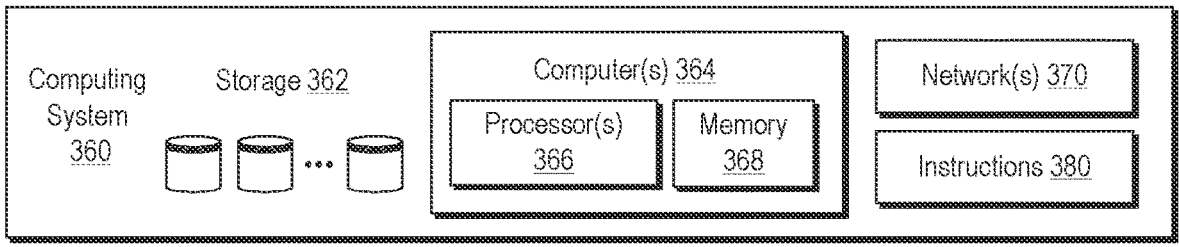

Computing
System
<u>360</u>

Storage <u>362</u>

Computer(s) <u>364</u>

Processor(s)
<u>366</u>

Memory
<u>368</u>

Network(s) <u>370</u>

Instructions <u>380</u>

Fig. 3

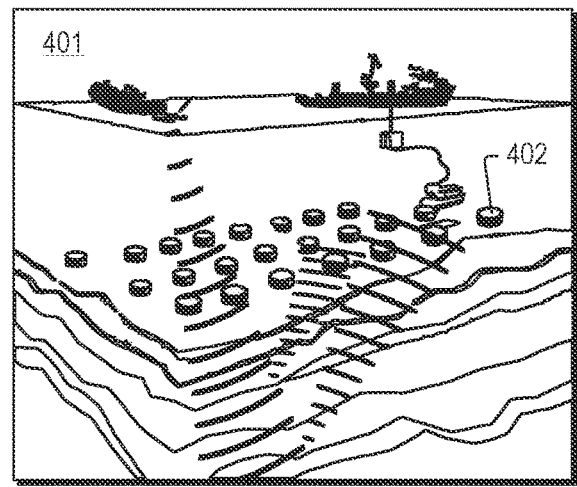
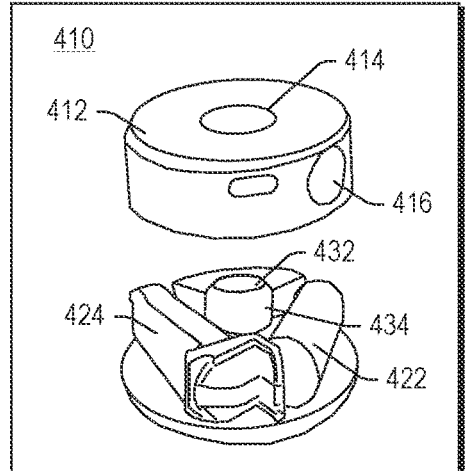
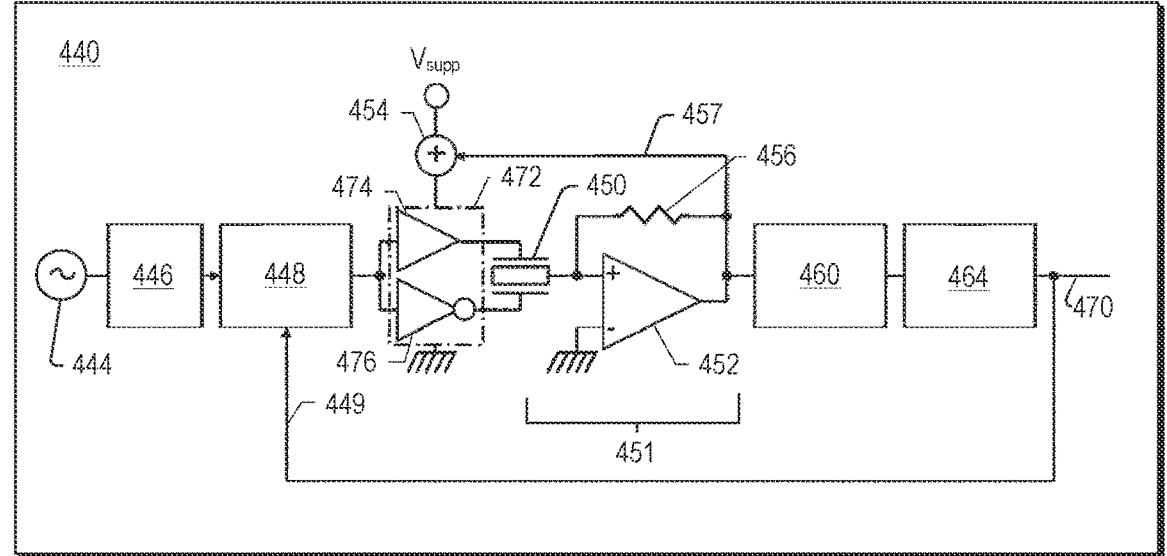
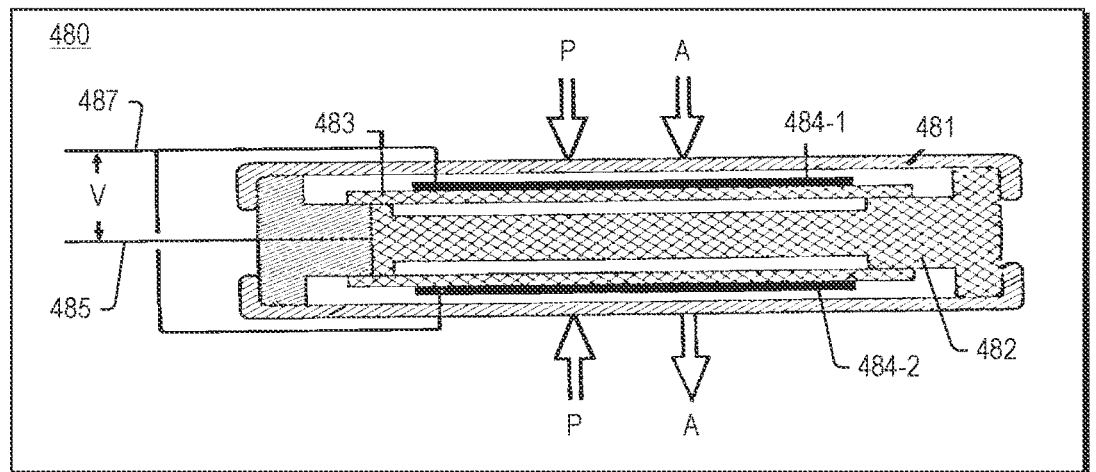
Fig. 4

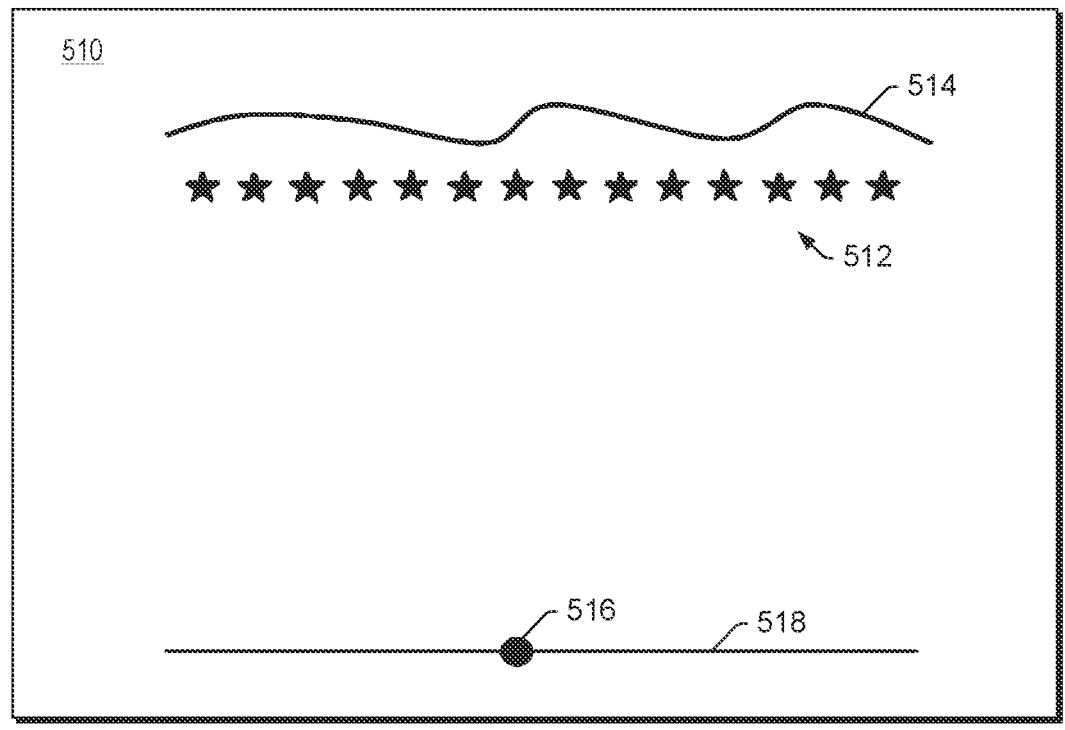
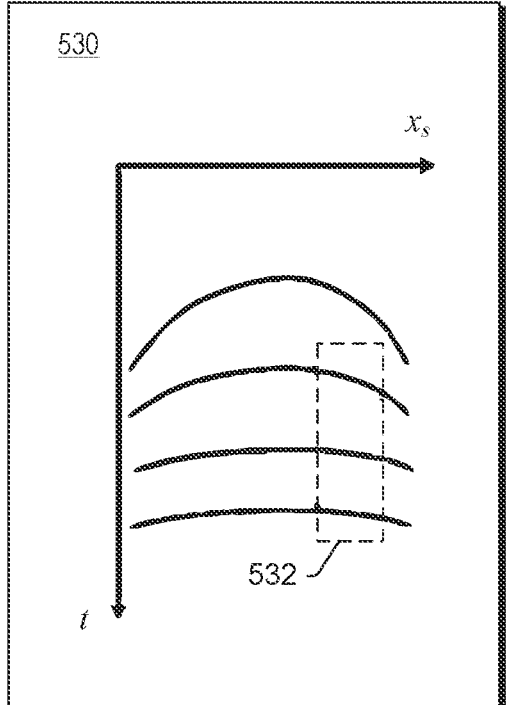
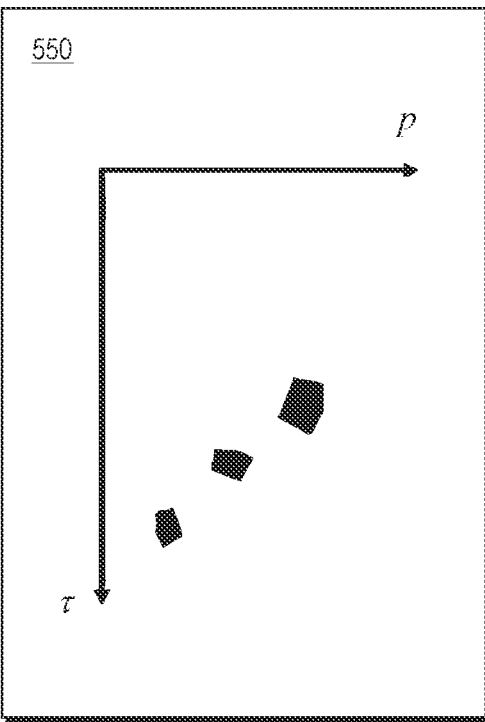
Fig. 5

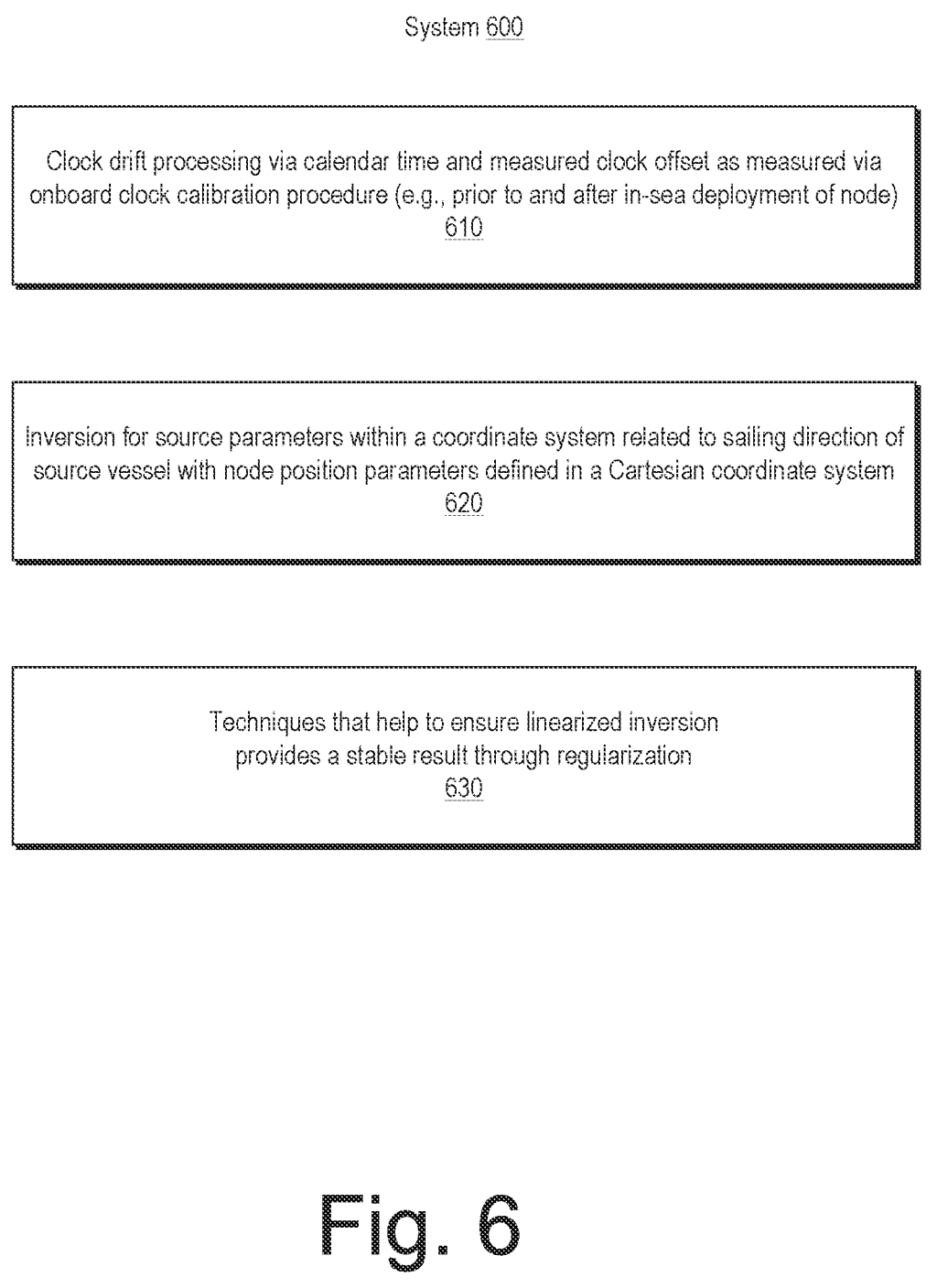

System 600

Clock drift processing via calendar time and measured clock offset as measured via onboard clock calibration procedure (e.g., prior to and after in-sea deployment of node)
610

Inversion for source parameters within a coordinate system related to sailing direction of source vessel with node position parameters defined in a Cartesian coordinate system
620

Techniques that help to ensure linearized inversion provides a stable result through regularization
630

Fig. 6

Method 800

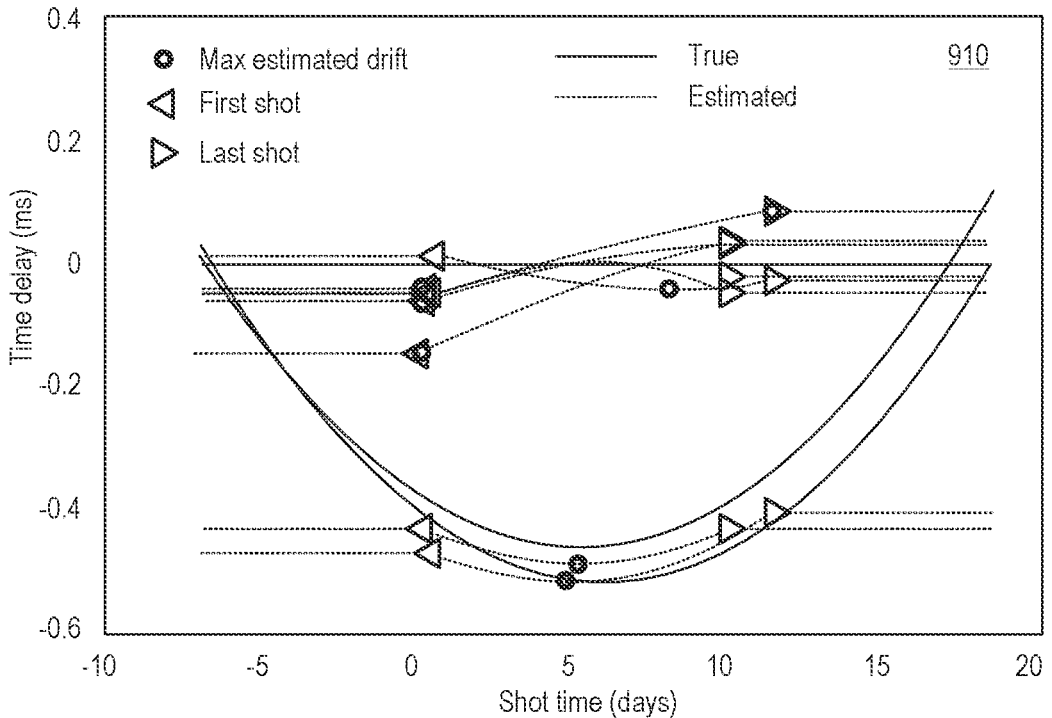
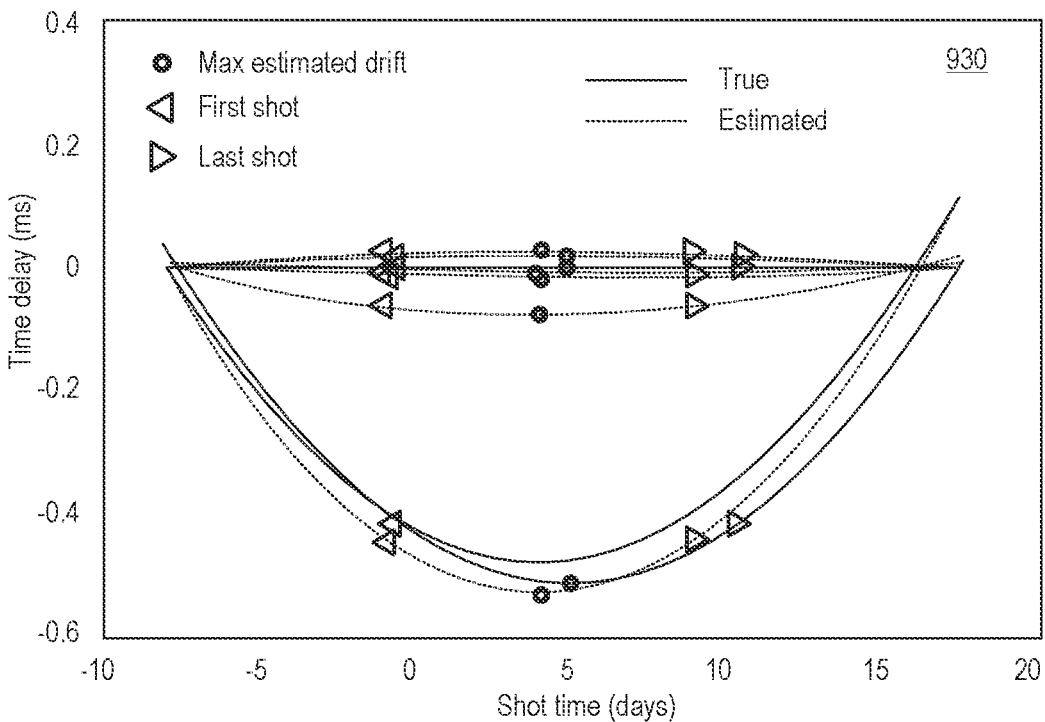
Fig. 9

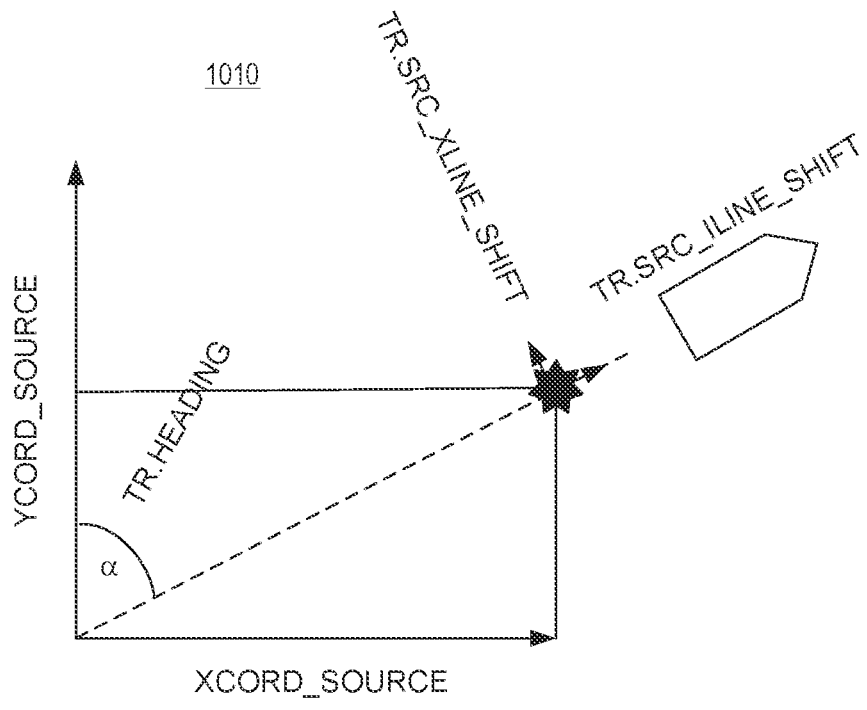
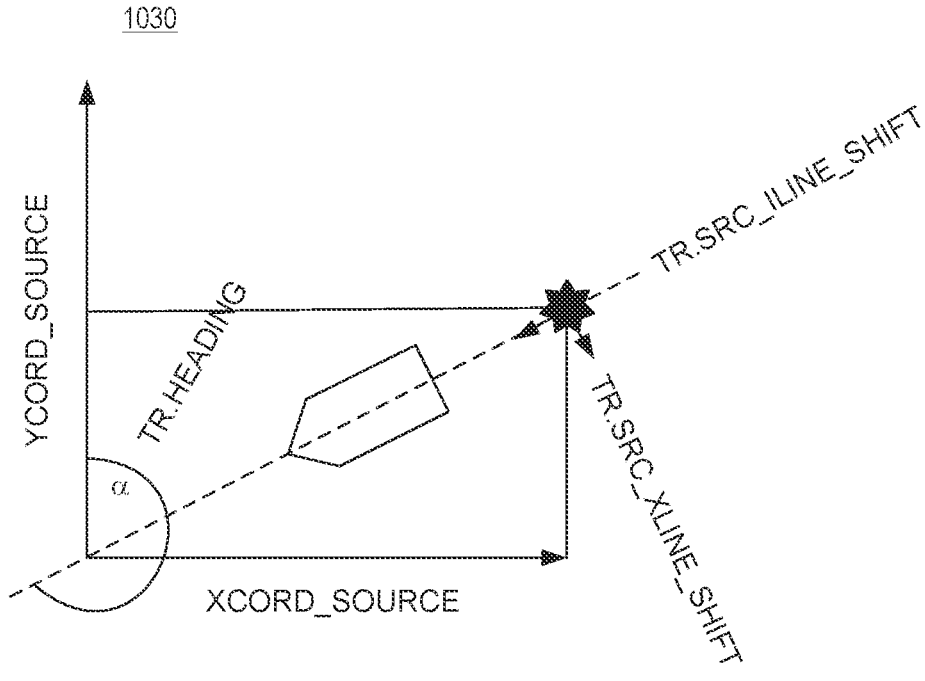
Fig. 10

Method 1400

Method 1500

Velocity Change in Top Layer with Time-dd
1810
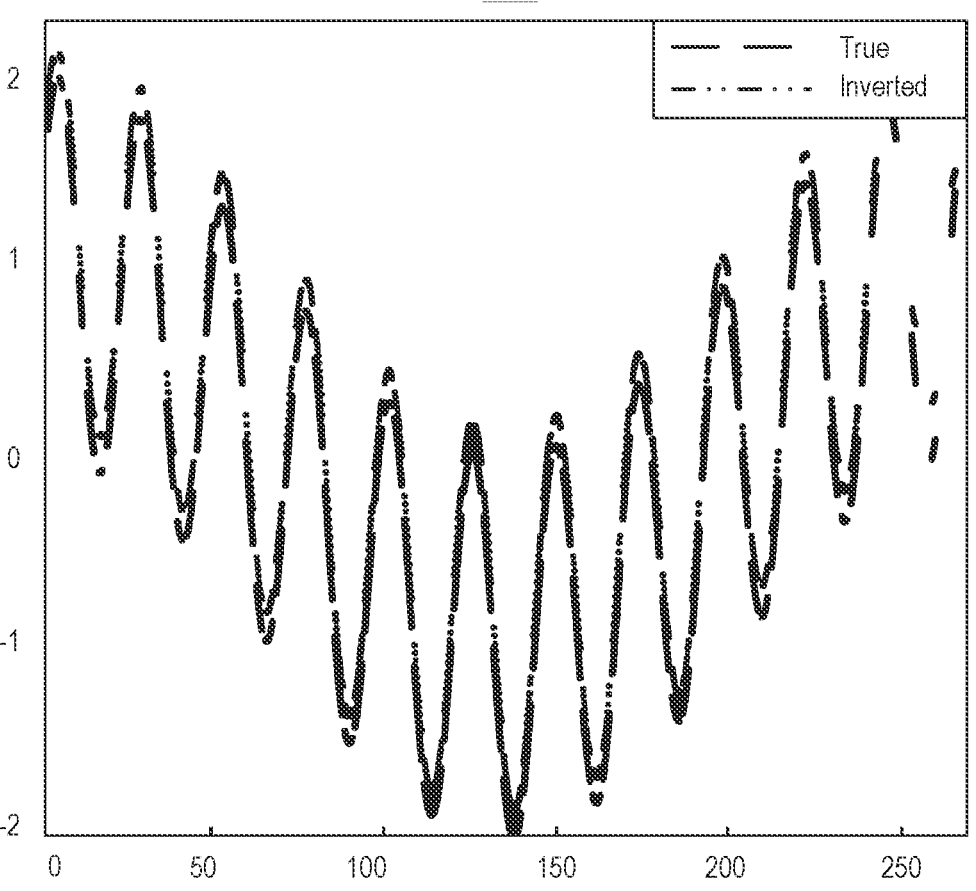
Values Comparison Parameter dd: V2 (m/s)
1830
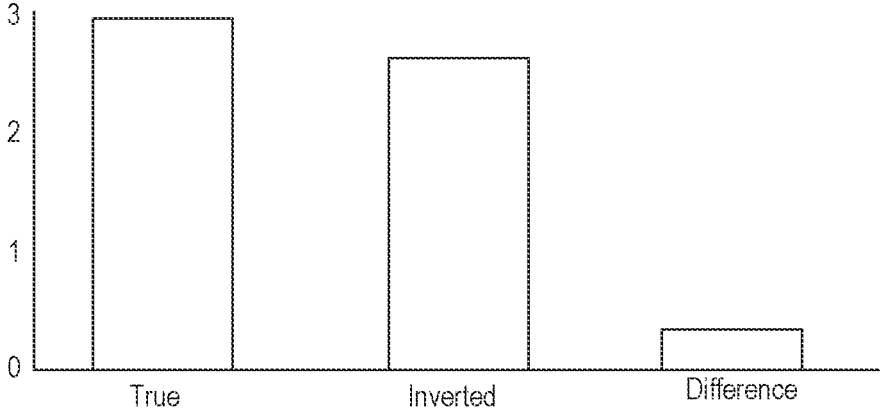
Fig. 18

1900

Method 2000

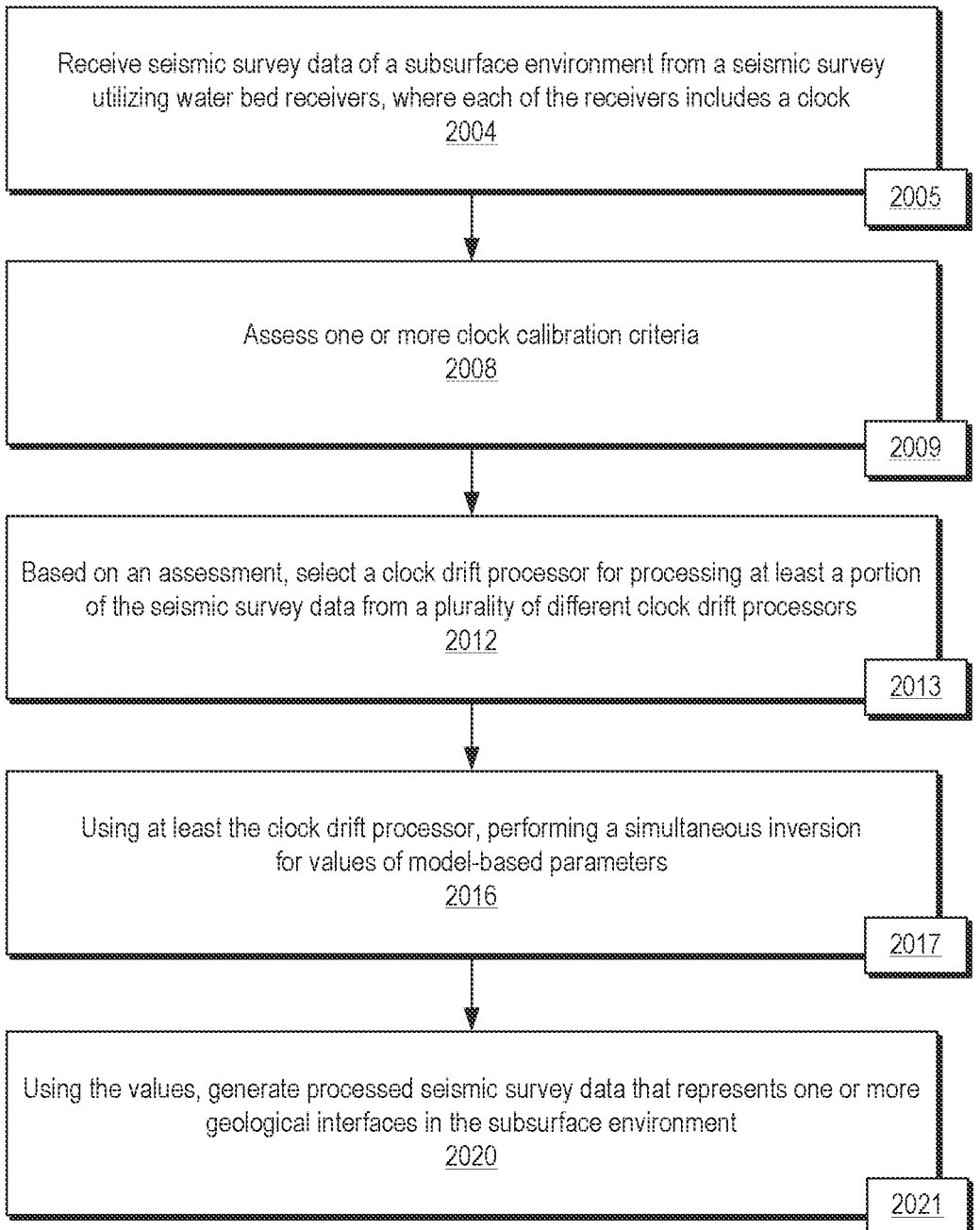

Receive seismic survey data of a subsurface environment from a seismic survey utilizing water bed receivers, where each of the receivers includes a clock
2004

2005

Assess one or more clock calibration criteria
2008

2009

Based on an assessment, select a clock drift processor for processing at least a portion of the seismic survey data from a plurality of different clock drift processors
2012

2013

Using at least the clock drift processor, performing a simultaneous inversion for values of model-based parameters
2016

2017

Using the values, generate processed seismic survey data that represents one or more geological interfaces in the subsurface environment
2020

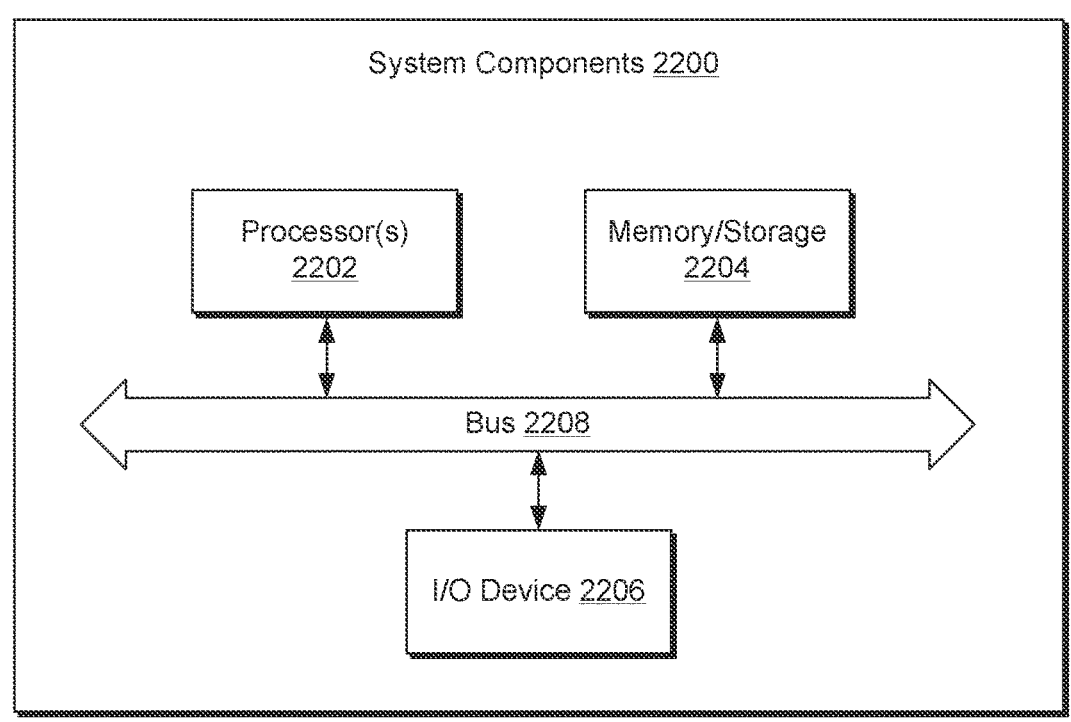
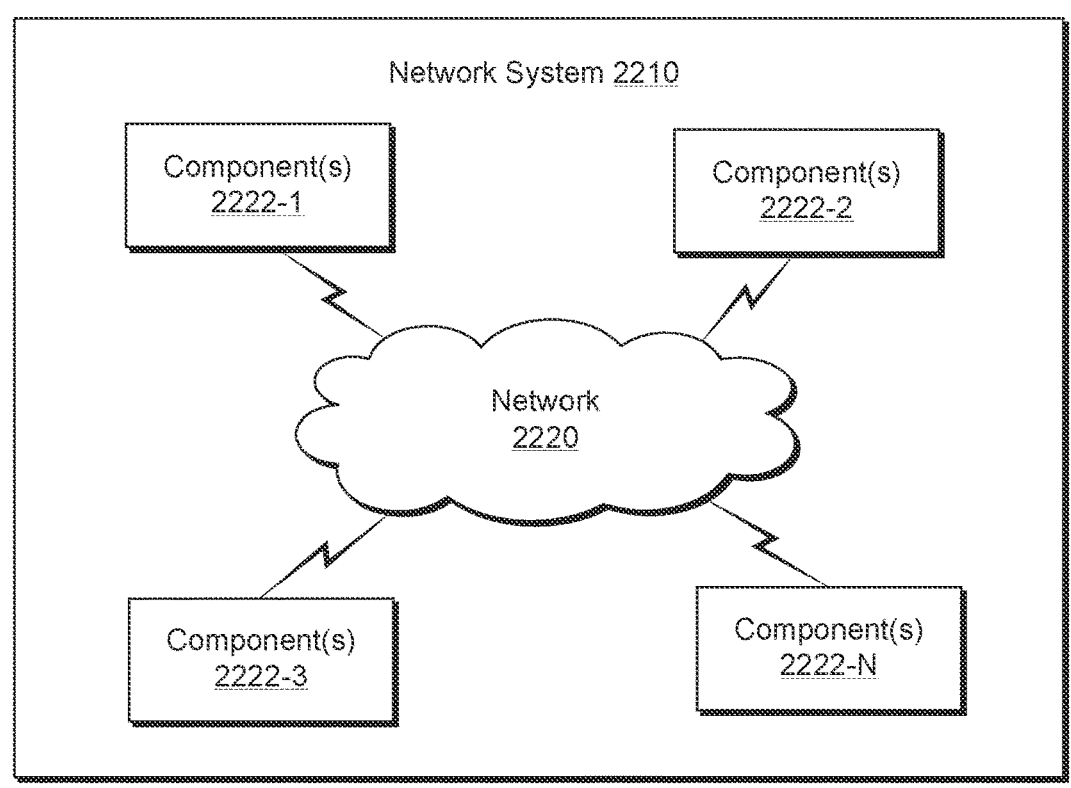
Fig. 22

MARINE SEISMIC IMAGING

RELATED APPLICATION

This application is a National Stage Entry of International Application No. PCT/US2022/070180, filed Jan. 13, 2022, which claims the benefit of and priority to a U.S. Provisional Application having Ser. No. 63/137,572, filed 14 Jan. 2021, which is incorporated by reference herein.

BACKGROUND

Reflection seismology finds use in geophysics to estimate properties of subsurface formations. Reflection seismology may provide seismic data representing waves of elastic energy as transmitted by P-waves and S-waves, in a frequency range of approximately 1 Hz to approximately 100 Hz. Seismic data may be processed and interpreted to understand better composition, fluid content, extent and geometry of subsurface rocks.

SUMMARY

A method can include receiving seismic survey data of a subsurface environment from a seismic survey utilizing water bed receivers, where each of the receivers includes a clock; assessing one or more clock calibration criteria; based on the assessing, selecting a clock drift processor for processing at least a portion of the seismic survey data from a plurality of different clock drift processors; using at least the clock drift processor, performing a simultaneous inversion for values of model-based parameters; and, using at least a portion of the values, generating processed seismic survey data that represents one or more geological interfaces in the subsurface environment. A system can include a processor; memory operatively coupled to the processor; and processor-executable instructions stored in the memory to instruct the system to: receive seismic survey data of a subsurface environment from a seismic survey utilizing water bed receivers, where each of the receivers includes a clock; perform an assessment of one or more clock calibration criteria; based on the assessment, select a clock drift processor for processing at least a portion of the seismic survey data from a plurality of different clock drift processors; using at least the clock drift processor, perform a simultaneous inversion for values of model-based parameters; and, using at least a portion of the values, generate processed seismic survey data that represents one or more geological interfaces in the subsurface environment. One or more computer-readable storage media can include computer-executable instructions executable to instruct a computing system to: receive seismic survey data of a subsurface environment from a seismic survey utilizing water bed receivers, where each of the receivers includes a clock; perform an assessment of one or more clock calibration criteria; based on the assessment, select a clock drift processor for processing at least a portion of the seismic survey data from a plurality of different clock drift processors; using at least the clock drift processor, perform a simultaneous inversion for values of model-based parameters; and, using at least a portion of the values, generate processed seismic survey data that represents one or more geological interfaces in the subsurface environment. Various other examples of methods, systems, devices, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 3 illustrates an example of a method and an example of a computing system;

FIG. 4 illustrates an example of a node, an example of an accelerometer and an example of a hydrophone;

FIG. 5 illustrates example plots;

FIG. 6 illustrates an example of a system;

FIG. 9 illustrates example plots;

FIG. 10 illustrates example plots;

FIG. 18 illustrates example plots;

FIG. 20 illustrates an example of a method;

FIG. 22 illustrates components of a system and a networked system.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology can provide seismic data representing waves of elastic energy, as transmitted by P-waves and S-waves, in a frequency range of approximately 1 Hz to approximately 100 Hz or optionally less than 1 Hz and/or optionally more than 100 Hz. Seismic data may be processed and interpreted to understand better composition, fluid content, extent and geometry of subsurface rocks.

Figure 1:
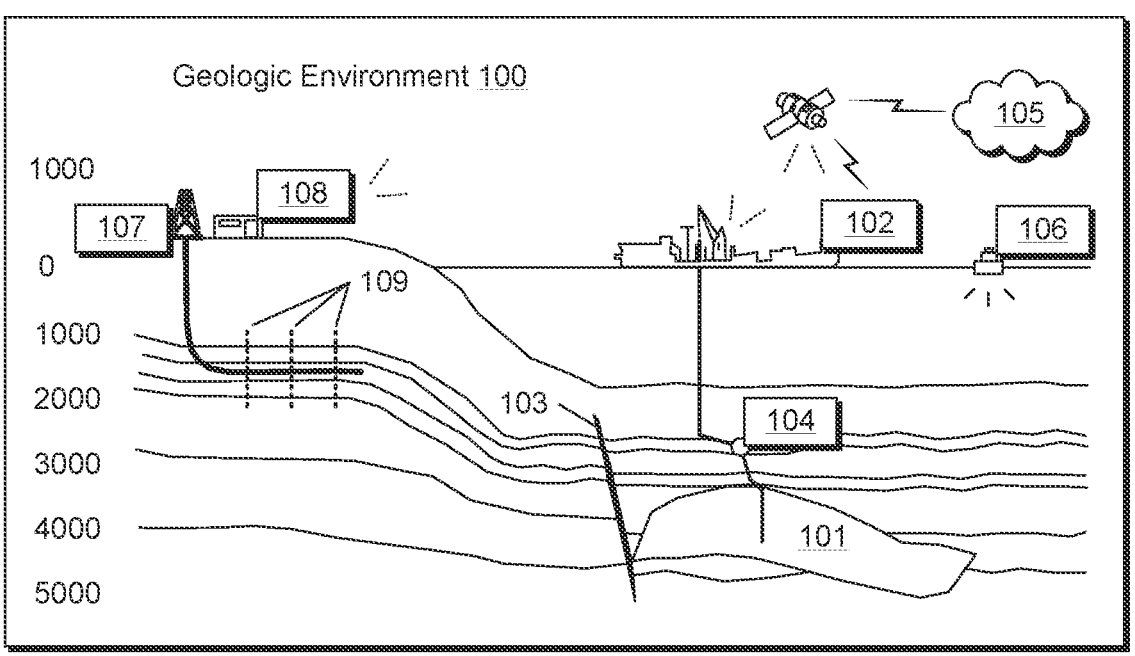
FIG. 1 illustrates an example of a geologic environment.

FIG. 1 shows a geologic environment 100 (an environment that includes a sedimentary basin, a reservoir 101, a fault 103, one or more fractures 109, etc.) and an example of an acquisition technique 140 to acquire seismic data (see data 160). A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101. A technique may provide information (as an output) that specifies one or more location coordinates of a feature in a geologic environment, one or more characteristics of a feature in a geologic environment, etc.

The geologic environment 100 may be referred to as a formation or may be described as including one or more formations. A formation may be a unit of lithostratigraphy such as a body of rock that is sufficiently distinctive and continuous.

A system may be implemented to process seismic data, optionally in combination with other data. Processing of data may include generating one or more seismic attributes, rendering information to a display or displays, etc. A process or workflow may include interpretation, which may be performed by an operator that examines renderings of information (to one or more displays, etc.) and that identifies structure or other features within such renderings. Interpretation may be or include analyses of data with a goal to generate one or more models and/or predictions (about properties and/or structures of a subsurface region).

A system may include features of a framework such as the PETREL seismic to simulation software framework (Schlumberger Limited, Houston, Texas). Such a framework can receive seismic data and other data and allow for interpreting data to determine structures that can be utilized in building a simulation model.

A system may include add-ons or plug-ins that operate according to specifications of a framework environment. As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

Seismic data may be processed using a framework such as the OMEGA framework (Schlumberger Limited, Houston, TX). The OMEGA framework provides features that can be implemented for processing of seismic data through prestack seismic interpretation and seismic inversion.

A framework for processing data may include features for 2D line and 3D seismic surveys. Modules for processing seismic data may include features for prestack seismic interpretation (PSI), optionally pluggable into a framework such as the DELFI framework environment.

In FIG. 1, the geologic environment 100 includes an offshore portion and an on-shore portion. A geologic environment may be or include one or more of an offshore geologic environment, a seabed geologic environment, an ocean bed geologic environment, etc.

The geologic environment 100 may be outfitted with one or more of a variety of sensors, detectors, actuators, etc. Equipment 102 may include communication circuitry that receives and that transmits information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry and/or be located on a seabed. Such equipment may include storage and communication circuitry that stores and that communicates data, instructions, etc. One or more satellites may be provided for purposes of communications, data acquisition, etc. FIG. 1 shows a satellite in communication with the network 105 that may be configured for communications, noting that the satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109; consider a well in a shale formation that may include natural fractures, artificial fractures (hydraulic fractures) or a combination of natural and artificial fractures. The equipment 107 and/or 108 may include components, a system, systems, etc. for fracturing, seismic sensing, analysis of seismic data, assessment of one or more fractures, etc.

A system may be used to perform one or more workflows. A workflow may be a process that includes a number of worksteps. A workstep may operate on data to create new data, to update existing data, etc. A system may operate on one or more inputs and create one or more results based on one or more algorithms. A workflow may be a workflow implementable in the PETREL software that operates on seismic data, seismic attribute(s), etc. A workflow may be a process implementable in the DELFI environment, etc. A workflow may include one or more worksteps that access a plug-in (external executable code, etc.). A workflow may include rendering information to a display (a display device). A workflow may include receiving instructions to interact with rendered information to process information and optionally render processed information. A workflow may include transmitting information that may control, adjust, initiate, etc. one or more operations of equipment associated with a geologic environment (in the environment, above the environment, etc.).

As an example, an acquisition technique can be utilized to perform a seismic survey. A seismic survey can acquire various types of information, which can include various types of waves (e.g., P, SV, SH, etc.). A P-wave can be an elastic body wave or sound wave in which particles oscillate in the direction the wave propagates. P-waves incident on an interface (at other than normal incidence, etc.) may produce reflected and transmitted S-waves ("converted" waves). An S-wave or shear wave may be an elastic body wave in which particles oscillate perpendicular to the direction in which the wave propagates. S-waves may be generated by a seismic energy sources (other than an air gun). S-waves may be converted to P-waves. S-waves tend to travel more slowly than P-waves and do not travel through fluids that do not support shear. Recording of S-waves involves use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) include the Thomsen parameters $\varepsilon$, $\delta$ and $\gamma$.

Seismic data may be acquired for a region in the form of traces. For example, a technique can utilize a source for emitting energy where portions of such energy (directly and/or reflected) may be received via one or more sensors (e.g., receivers). Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing scenario is divided by two (to account for reflection), for a vertically aligned source and sensor, the deepest boundary depth may be estimated to be about 10 km (assuming a speed of sound of about 5 km per second).

Figure 2:
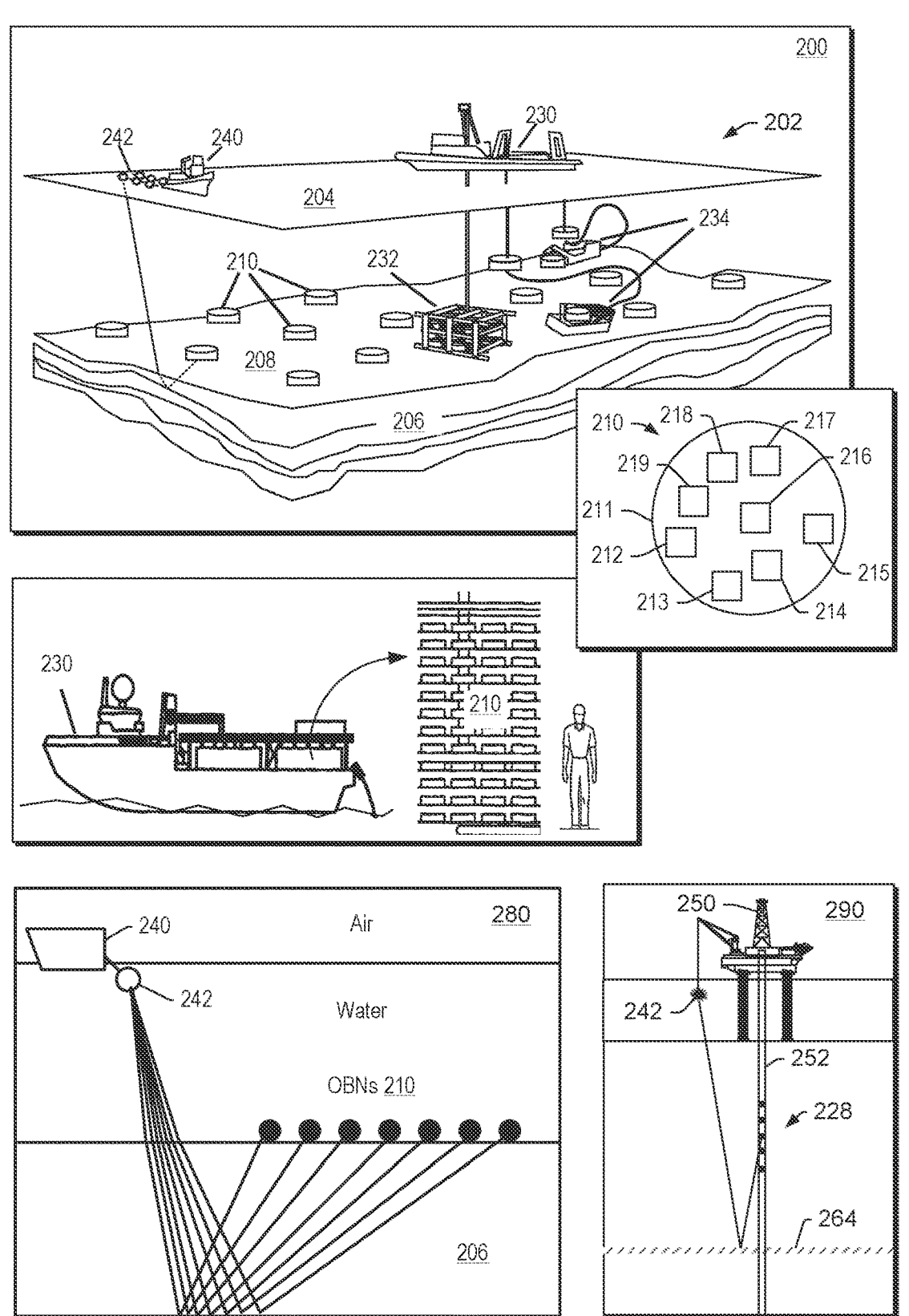
FIG. 2 illustrates an example of a system, an example of a node, and examples of survey techniques.

FIG. 2 shows a system 200 for acquisition of information in a geologic environment 202 that includes an air-water surface 204, a formation 206 and a seabed 208 (e.g., water-bed interface) where nodes 210 are positioned on the seabed 208. Equipment may be utilized to position the nodes 210 on the seabed 208 and retrieve the nodes 210 from the seabed 208. Such equipment may include one or more vessels 230, one or more carriers 232 and one or more vehicles 234, which may be autonomous, semi-autonomous, etc. (remotely operated vehicles (ROVs), etc.). The system 200 may include a seismic source vessel 240 that includes one or more seismic sources 242. The seismic source vessel 240 may travel a path while, at times, emitting seismic energy from the one or more sources 242. In such an approach, the nodes 210 can receive portions of the seismic energy, which can include portions that have travelled through the formation 206. Analysis of received seismic energy by the nodes 210 may reveal features of the formation 206.

In FIG. 2, the vessel 230 is shown as including nodes 210 as cargo arranged on racks. The nodes 210 can be deployed to form an array. An array of nodes may be cabled or un-cabled. A cable may be relatively light weight and utilized to deploy a node receiver line with nodes coupled to the cable at spaced intervals. A rack can be utilized to securely store nodes in slots along multiple rows and columns. An individual slot may include a communications portal that can establish communication via contact(s) and/or contactless/wireless with an individual node seated in the individual slot for download of information, etc. A rack can include charger circuitry that can charge one or more batteries of an individual node seated in an individual slot. A node can be sealed such that components (circuitry, one or more batteries, etc.) are not exposed to water when the node is deployed on an underwater bed. A seal may be a hermetic seal that aims to prevent passage of air and/or water. A seal or seals can aim to prevent intrusion of water from an exterior region to an interior region of a node. Such a node can be considered to be water-tight. A sealed node can be a self-contained piece of equipment that can sense information independent of other equipment when positioned on an underwater surface that may be a seabed.

A rack may be dimensioned in accordance with shipping container dimensions such as about 3 meters by about 7 meters by about 3 meters. As shown in FIG. 2, with reference to a silhouette of a person that is about 1.8 meters in height, a node may be about a meter or less in diameter and about half a meter in height or less.

In FIG. 2, the one or more sources 242 may be an air gun or air gun array (a source array). A source can produce a pressure signal that propagates through water into a formation where acoustic and elastic waves are formed through interaction with features (structures, fluids, etc.) in the formation. Acoustic waves can be characterized by pressure changes and a particle displacement in a direction of which the acoustic wave travels. Elastic waves can be characterized by a change in local stress in material and a particle displacement. Acoustic and elastic waves may be referred to as pressure and shear waves, respectively; noting that shear waves may not propagate in water. Collectively, acoustic and elastic waves may be referred to as a seismic wavefield.

Material in a formation may be characterized by one or more physical parameters such as density, compressibility, and porosity. In the geologic environment 202 of FIG. 2, energy emitted from the one or more sources 242 can be transmitted to the formation 206; however, elastic waves that reach the seabed 208 will not propagate back into the water. Such elastic waves may be received by sensors of the nodes 210. The nodes 210 can include motion sensors that can measure one or more of displacement, velocity and acceleration. A motion sensor may be a geophone, an accelerometer, etc. As to pressure waves, the nodes 210 can include pressure wave sensors such as hydrophones.

In FIG. 2, the nodes 210 can include sensors for acquiring seismic wavefield information at the seabed 208. Each of the nodes 210 can include one or more hydrophones and/or one or more motion sensors (one or more geophones, one or more accelerometers, etc.).

A node can include various types of circuitry. Such circuitry can include circuitry that can digitize (analog to digital conversion ADC circuitry) and can include circuitry that can record signals (a microcontroller, a processor, etc., operatively coupled to memory). Each of the nodes 210 can include a housing 211, sensors 212 and 213, one or more microcontrollers or processors 214, one or more batteries 215, memory 216, ADC circuitry 217, a compass 218, communication circuitry 219, etc. As an example, a node can include one or more clocks, which may be amenable to calibration, synchronization, etc. For example, consider synchronizing to a signal, calibrating against a value, etc. As an example, a node can provide for receiving seismic energy and generating digital data that can be coded or otherwise stamped with information corresponding to time (e.g., according to one or more clocks). Various components of a node may be operatively coupled via wires, connectors, etc. A node can include one or more circuit boards (printed circuit boards, etc.) that can provide for electrical connections between various components, etc.

Depending on equipment, processes, etc., the longer a duration of deployment can correspond to a greater influence of factors that may contribute to drift between a source clock and a sensor clock, which can result in problems with processing of seismic measurements. As explained, one or more techniques may be utilized for clocks to be calibrated back into synchronization. The degree of drift between the clocks may be affected by various factors, which can include, for example, calibration errors, clock accuracy, clock housing (temperature control, shock resistance, etc.), etc.

As an example, a node may be instructed prior to deployment, at time of deployment, after deployment, etc., for example, to perform recording. As an example, a preset timer, a control signal (e.g., acoustic, optical, low frequency radio, etc.) internal and/or transmitted through water, through a cable, etc., may be utilized. As an example, a clock may be synchronized to a calibrated clock such as a GPS clock, rubidium clock, cesium clock, or other clock (e.g., prior to deployment, during deployment, after deployment, at retrieval, etc.).

After deployment, one or more acoustic techniques may be utilized to determine node locations. A technique may employ acoustic pinging where acoustic pingers emit relatively high-frequency pings that are substantially above the maximum frequency of interest for seismic applications. Such relatively high-frequency acoustic signals can be picked up by one or more seismic sensors. Triangulation or one or more other techniques may be utilized to determine node locations for nodes deployed on an underwater surface such as a seabed.

Nodes may be utilized to acquire information spatially and temporally such as in a time-lapse seismic survey, which may be a four-dimensional seismic survey (4D seismic survey). A seismic image of a formation may be made for a first survey and a seismic image of the formation may be made for a second survey where the first and second surveys are separated by time (lapse in time). In such an approach, a comparison of the images can infer changes in formation properties that may be tied to production of hydrocarbons, injection of water or gas, etc.

A first survey may be referred to as a baseline survey, while a subsequent survey may be referred to as a monitor survey. To minimize artifacts in differences between seismic images from successive lapses, a monitor survey may aim to replicate a configuration of a corresponding baseline survey. Where nodes are utilized at various positions on a seabed for a baseline survey, a monitor survey may aim to place nodes on the seabed in a manner that replicates the various positions of the nodes of the baseline survey. For the monitor survey, the nodes may be the same nodes, include some of the same nodes, include some different nodes or may be different nodes. A service may have a stock of nodes that can be utilized for various surveys where once a survey is complete, the nodes are retrieved, transported and positioned for another survey. Such a service may update, replace, etc., nodes from time to time.

A position to within a few meters of accuracy of one or more nodes may be determined via one or more of GPS, an acoustic positioning system (a short-baseline (SBL) or ultra-short baseline (USBL) acoustic system), and one or more other types of systems.

A node can include sensor circuitry for acquiring measurements of a seismic pressure wavefield and its gradient; consider sensor circuitry that can measure a seismic pressure wavefield and its gradient in vertical and crossline directions.

A node can include point-receiver circuitry. A point-receiver approach can combine hydrophones with tri-axial microelectromechanical system (MEMS) accelerometers. In such an approach, the MEMS accelerometers can measure a substantial bandwidth of particle acceleration due to seismic wavefields. Measurements of particle acceleration can be directly related to a gradient in a pressure wavefield. A node may include the ISOMETRIX technology, which includes point-receiver circuitry (Schlumberger Limited, Houston, Texas).

In the example of FIG. 2, one of the nodes 210 may be connected to one or more other nodes of the nodes 210 via a cable. A vessel may include a cable that is operatively coupled to at least one node. In the system 200 of FIG. 2, nodes may be deployed according to a survey plan in a grid pattern; consider placement of nodes on a seabed according to an x,y grid where distance between adjacent nodes may be of the order of hundreds of meters. As shown in the system 200, the seismic source vessel 240 may be employed with the one or more sources 242 that can emit energy, which can, in turn, be received via one or more of the nodes 210.

As an example, a common shot approach 280 may be utilized, as illustrated via the formation 206, the OBNs 210, the seismic source vessel 240 and the one or more sources 242. As explained, the vessel 240 can tow one or more sources at or below an air-water interface where the OBNs 210 can be positioned on a water-formation interface (e.g., a seafloor, seabed, ocean bottom, sea bottom, etc.). As shown, the energy of the source or the sources 242 passes through the water and then into the formation 206 where a portion of the energy is reflected at an interface (e.g., a reflector). As shown, energy can reflect off the interface and progress upwardly to the OBNs 210, which can be receivers that record the energy.

When seismic traces of a gather come from a single shot and many receivers, they can form a common shot gather; whereas, a single receiver with many shots can form a common receiver gather. A shot gather is a plot of traces with respect to line distance (e.g., an inline or a crossline series of receivers) with respect to time.

Also shown in FIG. 2 is an inset of a zero-offset vertical seismic profile (VSP) scenario 290. In such a scenario, an acquisition geometry may be limited to an ability to position equipment that is physically coupled to a rig 250. As shown, for given the acquisition geometry, there may be no substantial offset between the source 242 and a bore 252. In such a scenario, a zero-offset VSP may be acquired where seismic waves travel substantially vertically down to a reflector (see the layer 264) and up to receivers 228, which may be a receiver array. Where one or more vessels are employed, one or more other types of surveys may be performed. A three-dimensional VSP may be performed using a vessel. As an example, a VSP may be performed using one or more nodes, etc.

FIG. 3 shows an example of a method 350 as including a reception block 352 for receiving desired locations of nodes for deployment on a seabed of a seismic survey where each of the nodes includes a sealed housing and, within the sealed housing, at least one battery and spaced seismic sensors electrically powered by the at least one battery; a determination block 354 for determining locations of the nodes as deployed on the seabed where at least some of the determined locations differ from their corresponding desired locations; an acquisition block 356 for acquiring seismic data sensed by the spaced seismic sensors of the nodes where the acquired seismic data corresponds to the determined locations; and a generation block 358 for, based at least in part on the acquired seismic data, a spacing of the spaced seismic sensors and the desired locations, generating seismic data for the desired locations.

The method 350 is shown in FIG. 3 in association with various computer-readable media (CRM) blocks 353, 355, 357 and 359. Such blocks generally include instructions suitable for execution by one or more processors (or cores) to instruct a computing device or system to perform one or more actions. While various blocks are shown, a single medium may be configured with instructions to allow for, at least in part, performance of various actions of the method 350 (e.g., using the computing system 360, etc.). A computer-readable medium (CRM) may be a computer-readable storage medium that is not a carrier wave, that is not a signal and that is non-transitory.

FIG. 3 also shows the computing system 360 as including one or more information storage devices 362, one or more computers 364, one or more network interfaces 370 and instructions 380. As to the one or more computers 364, each computer may include one or more processors (or processing cores) 366 and memory 368 for storing instructions executable by at least one of the one or more processors. A computer may include one or more network interfaces (wired or wireless), one or more graphics cards, a display interface (wired or wireless), etc. A system may include one or more display devices (optionally as part of a computing device, etc.). Memory can be a computer-readable storage medium. A computer-readable storage medium is not a carrier wave, is not a signal and is non-transitory.

As explained, a geophone can be a sensor configured for seismic acquisition, whether onshore and/or offshore, that can detect velocity produced by seismic waves and that can transform motion into electrical impulses. A geophone may be configured to detect motion in a single direction. A geophone may be configured to detect motion in a vertical direction. Three mutually orthogonal geophones may be used in combination to collect so-called three-component (3C) seismic data. A hydrophone may be a sensor configured for use in detecting seismic energy in the form of pressure changes under water during marine seismic acquisition. A node may include at least one geophone that can provide for motion detection and at least one hydrophone that can provide for pressure detection. Data (analog and/or digital) may be transmitted from a node (via wire, wirelessly, etc.) for processing, etc. Four-component (4C) borehole or marine seismic data can be acquired using three orthogonally-oriented geophones and a hydrophone within an ocean-bottom sensor (deployed in node-type system, a cable-type system, etc.). A 4C node in contact with the seabed (formation) can measure shear waves (geophone-based sensing) and can measure compressional waves (hydrophone-based sensing).

A source or source array may be activated periodically, such as about each 25 m (about at 10 second intervals) where the resulting sound wave travels into the Earth, which may be reflected back by one or more rock layers to one or more sensors, which may then be relayed as signals (data, information, etc.) to equipment.

Pressure data may be represented as "P" and velocity data may be represented as "Z"; noting, however, that the vertical component of a measured particle velocity vector may be denoted "V" and that "Z" may refer to a scaled, measured particle velocity. "V" may represent a measured velocity and "Z" may represent a scaling thereof.

As mentioned, a hydrophone can sense pressure information (P data) and a geophone may sense velocity information (V and/or Z data). A hydrophone may output signals, optionally as digital data for receipt by a system. A geophone may output signals, optionally as digital data for receipt by a system. The system 360 of FIG. 3 may receive P and V/Z data via one or more of the one or more network interfaces 370 and process such data via execution of the instructions 380 stored in the memory 368 as accessed by one or more of the one or more processors 366. The system 360 may store raw and/or processed data in one or more of the one or more information storage devices 362.

FIG. 4 shows a geologic environment 401 that includes nodes 402, a node 410, an accelerometer 440 and a hydrophone 480. As shown in FIG. 4, the node 410 can include a top cover 412, a communication antenna 414, an interface 416, one or more batteries 422, a recorder 424, a hydrophone sensor package 432 and a geophone sensor package 434. The recorder 424 can record information acquired by the hydrophone sensor package 432 and/or the geophone sensor package 434. Information acquired by the node 410 may be transmitted via the communication antenna 414 to a receiver, which may be part of communication equipment carried by a vessel, etc. The node 410 may be positioned on a seafloor via a vehicle (a remotely operated vehicle, a robot, etc.).

As shown in FIG. 4, the nodes 402 may be positioned over a particular area of the seafloor as specified by a seismic survey plan. The nodes 402 may be positioned in a grid pattern. Such a grid pattern may specify a distance or distances between neighboring nodes. An array of nodes such as the nodes 402 may be referred to as a patch. Information acquired by nodes can be processed and analyzed to increase understanding of structures in a sub-seafloor environment.

One or more of the accelerometers 440 may be included in the geophone sensor package 434. As to the hydrophone sensor package 432, it can include a single pressure sensor or more than one pressure sensor.

As shown in FIG. 4, the accelerometer 440 can include a system clock generator 444, a jitter filter 446, a pulse generator 448, a return connection 449, a sensor 450, a charge amplifier 451, an adder 454, a resistor 456, an adder connection 457, an amplitude detector 460, a loop controller 464, a digital output 470 and logic 472 with complimentary drivers 474 and 476.

In FIG. 4, the accelerometer 440 can include a capacitive MEMS-based sensor. As illustrated in FIG. 4, the sensor 450 can include an armature and a pair of fixed position electrodes attached to the armature. A sensor may include a differential capacitor, in which a mobile electrode moves along a sensitive axis in response to an external acceleration.

The accelerometer 440 may be subjected to inertial forces caused by an external acceleration where a proof mass may be kept in an equilibrium position by electrostatic forces controlled via feedback circuitry. In FIG. 4, the amplitude detector 460 and the loop controller 464 can provide a substantially high gain where residual movement of a mobile mass with respect to its equilibrium position may be kept close to a null point. In such an approach, magnitude and direction of a net restoring force can be a difference between attractive forces working in opposite directions.

A type of noise, referred to as sampling noise, can be defined as kT/C noise (thermal noise), which may be introduced by switching and can degrade a dynamic range of a sensor. In FIG. 4, the accelerometer 440 can include the charge amplifier 451 configured with an input terminal that is continuously connected to a mobile electrode (during times in which the sensor 450 receives both actuation and activation voltages). In such an approach, sampling noise can be reduced in comparison to circuitry that does not include such a configuration of components.

In FIG. 4, the accelerometer 440 can include a constant charge drive for the sensor 450. The charge amplifier 451 of the accelerometer 440 can modulate, or adjust, actuation voltage based on a proof mass movement, which may thereby increase available signal-to-noise ratio. As shown in FIG. 4, a feedback network can be associated with the charge amplifier 451. An output terminal of the amplifier 452 can be connected via the adder connection 457 to the adder 454, which can combine an output signal from the amplifier 452 with a supply voltage $V_{supp}$. In such an arrangement, the supply voltage that is applied to the logic 472, from the adder 454, can be modulated according to a sensed signal that as available at the output terminal of the amplifier 452; and as a result, the actuation force can be independent of the proof mass movement.

A sensor package may include a three component (3C) particle motion sensor assembly; consider a 3C accelerometer assembly. Such an assembly may acquire inline (x), crossline (y) and vertical (z) particle acceleration measurements; consider an accelerometer assembly that includes microelectromechanical system (MEMS) sensor units that sense accelerations along respective inline (x), crossline (y) and vertical (z) axes. A grid of a survey may be defined via a corresponding coordinate system (at least in inline (x) and crossline (y) directions). In a package, orientations of MEMS sensor units may be appropriately varied for purposes of alignment with corresponding axes.

In FIG. 4, as shown in an approximate cross-sectional view, the hydrophone 480 can include a sheath 481, a core 482, an electrode 483 and at least one piezoelectric element 484-1 and 484-2, which may be a ceramic-based piezoelectric element or elements. As shown, a potential (V) may be measured across wires 485 and 487 where the potential (V) varies based at least in part on response of the at least one piezoelectric element 484-1 and 484-2 to external forces such as pressure and/or acceleration.

A piezoelectric material can produce an electrical potential when it is subjected to physical deformation. A piezoelectric material can include a crystalline structure (quartz, tourmaline, a poly-crystalline ceramic, etc.). A lead zirconate titanate (PZT) may be utilized.

A hydrophone can include a plate of piezoelectric ceramic placed on an elastic electrode. In such an approach, the active element can be deformed by pressure variations in surrounding water and produce a voltage collected between the electrode and a terminal bonded to the other face. The electrode can rest on a metallic core that supports its ends and that may also limit its maximum deformation (to avoid damage to the ceramic). A hydrophone can be configured to preserve integrity even where it may be accidentally submitted to high pressures.

As the active element has mass, it can produce a voltage when it is subjected to acceleration. To diminish the effect of acceleration, a hydrophone can be assembled with elements that may be paired, as shown in FIG. 4 (see elements 484-1 and 484-2 with respect to the direction of acceleration). In such an arrangement, voltage produced by acceleration can cancel whereas voltage produced by pressure can add. While voltage is mentioned, a hydrophone may be configured with circuitry such that current provides an indication of sensed pressure.

As mentioned, a 4D seismic survey involves acquisition of 3D seismic data at different times over a particular area. Such an approach can allow for assessing changes in a producing hydrocarbon reservoir with respect to time. Changes may be observed in one or more of fluid location and saturation, pressure and temperature. 4D seismic data can be considered to be a form of time-lapse seismic data.

Nodes can be utilized as an alternative to permanent seabed cables, which have been installed in various fields to acquire 4D seismic data. Nodes can be deployed to acquire seismic data (4D seismic data) and can be retrievable after acquisition of the seismic data. A 4D seismic survey may call for one or more processes aimed at repeatability of data. One factor affecting repeatability of seismic data can be the difference in position of the receiver and the source between the two phases of a 4D survey (a baseline survey phase and a monitor survey phase).

The nodes 402 illustrated in FIG. 4 may be seismic seabed nodes that can be utilized to perform a 4D seismic survey. As mentioned, the nodes 402 may be deployed via use of a ROV. A time lapse survey can include a baseline survey phase and a monitor survey phase where each phase includes positioning nodes at locations on a seafloor. Multiple monitor surveys may optionally be performed.

Quality of 4D seismic data can depend in part on repeatability of source and receiver positions between a baseline survey phase and a monitor survey phase. Positioning repeatability demands may be determined as part of a survey development stage. Positions, as to repeatability, may be monitored during acquisitions associated with a baseline survey phase and a monitor survey phase. Such a process may be referred to as position monitoring. A survey can include monitoring positioning repeatability during acquisition such that reshoots and/or infills planned.

A framework may be implemented to monitor 4D positioning repeatability during marine acquisitions. For each trace of a monitor survey a matching function can be used to search for the most similar trace in a baseline dataset. Similarity of traces can be expressed using the normalized root mean square (NRMS). For a pair of matching traces, a number of positioning difference attributes may be derived and mapped. Such attributes can be calibrated against NRMS values measured on 4D seismic difference data. In such an approach, positioning acceptance criteria can be set based on NRMS demands for a survey. 4D positioning measurements can help to define re-shoots and infill during acquisition and may provide insight into quality and repeatability of 4D seismic data.

In an effort to acquire more subtle 4D signals, a survey may aim to reduce an NRMS value to about 10 percent or less with a corresponding source positioning error plus receiver positioning error of about 10 meters to about 80 meters, which may depend on overburden heterogeneity. Higher quality 4D survey data points may be associated with about 25 meter to about 40 meter repeatability to produce NRMS levels that are less than about 10 percent (for seismic streamer surveys of regions underlying the North Sea).

A baseline survey can include positioning of nodes according to a first grid in a first region, gathering the nodes, positioning the nodes according to a second grid in a second region, gathering the nodes and repositioning them according to the first grid in the first region (for a time-lapse survey of the first region). The nodes 402 may be positioned according to a first grid, utilized to acquire data, positioned according to a second grid and utilized to acquire data. A survey may aim to position nodes at locations that were previously used (repositioning of nodes). Such a survey may reuse nodes or may utilize new or different nodes.

A survey can include a data repeatability process where an ROV or other suitable equipment is utilized to deploy nodes at prior positions of a grid associated with a baseline survey phase of a 4D seismic survey. In such an approach, the nodes are to be repositioned as closely as possible to their prior positions. This may be considered to be a constraint on the data repeatability process. To meet such a constraint, an operator of an ROV may spend a considerable amount of time in deploying nodes to their prior positions.

A method can include deploying nodes with relaxed placement accuracy. A method can include calculating (estimating) seismic data at a baseline node position that is a short distance away from a location of a seabed receiver, using data recorded by sensors at that seabed receiver, including seismic and seismic gradient sensors.

For a survey, nodes may be deployed via an ROV, via a rope or via one or more other techniques. A rope based approach may provide for coverage of an area in a more expeditious manner than an ROV based approach that places nodes one node at a time.

As to streamer based approaches, one approach to predict the seismic data at the same location as for a previous survey, even if the receivers are located differently, can involve interpolating or reconstructing the seismic data between receivers. For towed streamer data, a method can include reconstructing seismic data between receivers using gradients where measurements of the wavefield and its gradients are available. In such an approach, via use of known gradients, it is possible to reconstruct data (values) above the Nyquist spatial sampling criteria; however, such an approach can depend on spacing, as it may be problematic to reconstruct between receivers separated by distances of more than about 125 meters to about 150 meters.

As to a node based approach, for a 4D seabed node survey, the node spacing may be of the order of 100 meters or more. A seabed node survey can utilize spacing of the about 300 meters to about 400 meters.

As an example, an OBN survey can include an acquisition scenario involving sparse ocean bottom node (OBN) acquisition where sources are fired according to a dense grid(s) and where nodes are positioned according to a sparse grid(s). As an example, an OBN survey seismic acquisition can involve approximately 50 m sampling for sources and approximately 200 m to approximately 300 m spacing of nodes in an inline direction and in a crossline direction.

FIG. 5 shows a series of plots 510, 530 and 550. In FIG. 5, the plot 510 shows a 2D representation of an ocean bottom node (OBN) geometry where stars indicate (relatively) densely sampled sources 512 located just beneath the sea surface 514 and where a black, filled circle represents a node 516 on the seabed 518. As to the plot 530, it shows representation of a shot gather and, as to the plot 550, it shows a representation of the intercept time-slowness (tau-p) decomposition of the data in the dashed box 532 of the plot 530.

In ocean bottom acquisition, sources may be arranged according to a dense grid as shown in the plot 510 (of an ocean bottom node (OBN) survey). Such an arrangement of equipment may provide for decomposing a wavefield. As an example, a method can include performing decomposition for each source location in turn (since the observed wavefield may be different for each source position) or to use a small number of sources at the same time, since for some events it can be expected that relatively small changes exist across a small number of sources. The wavefield observed at the node in the plot 510, due to the plurality of sources, can be decomposed into a number of plane waves; consider a method that can include transferring data into the intercept time-slowness (tau-p) domain (see the plots 530 and 550).

As mentioned, as an example, an OBN survey seismic acquisition can involve approximately 50 m sampling for sources and approximately 200 m to approximately 300 m spacing of nodes in an inline direction and in a crossline direction. As an example, dense can refer to a higher spatial density. For example, source locations can be more dense or dense compared to receiver locations (e.g., node locations). As an example, coarse can refer to a lower spatial density. For example, receiver locations (e.g., node locations) can be more coarse or coarse compared to source locations.

As an example, a method can be utilized for dense ocean bottom node (OBN) interpolation using priors derived from reciprocity. For example, consider using a principle of reciprocity. In such an example, a seismogram can be expected to be the same when recorded using a source at a first location and a geophone at a second location and when recorded using a geophone at the first location and a source at the second location (e.g., positions of source and geophone exchanged).

While the principle of reciprocity can hold true for an individual source-receiver pair irrespective of where sources and receivers in the medium are placed, for building priors (e.g., priors derived from reciprocity), a method can demand that a common receiver gather and a common shot gather meet one or more criteria. For example, consider one or more criteria that specify similarity to each other in terms of moveout (dip) of seismic events.

The aforementioned similarity tends to hold true when the sources and the receivers are collocated in space, which tend not to be true for OBN surveys where the sources and the receivers are placed at different depth levels.

Where depth levels differ, the seismic events in both receiver gathers and shot gathers exhibit different moveout. Again, the principle of reciprocity can remain valid for an individual pair of source and receiver in the OBN survey even if they are placed at different depth levels.

To address depth level concerns, one or more adjustments may be made as to interpolated common receiver gathers. For example, an adjustment can involve adjusting for a water velocity correction that accounts for changes in sea conditions over time, and an adjustment can involve using a constant water velocity re-datuming approach to map sources and receiver to a common datum level.

FIG. 6 shows an example of a system 600 that can include one or more of various components. For example, consider a component 610 that provides for clock drift processing using a calendar time and a measured clock offset that can be, for example, measured via an onboard clock calibration procedure that may be conducted prior to and after in-sea deployment of a node. As another example, consider a component 620 that can provide for inversion for source parameters within a coordinate system related to sailing direction of a source vessel while node position parameters may be defined in a Cartesian coordinate system. As yet another example, consider a component 630 that can provide one or more techniques that help to ensure that a linearized inversion provides a stable result through regularization.

One or more of the components 610, 620 and 630 can be utilized in OBN seismic surveys where, for example, a number of nodes may range from approximately 5 to 1000 or more (e.g., thousands, etc.) that can be located on the seafloor, which may be at a shallow, deep, intermediate, etc., depth (e.g., consider deep as being greater than approximately 1000 m below a water/air interface referenced as the water surface.

As explained, a survey can include generation of seismic shots by activating arrays of seismic sources towed by one or more source vessels. Multiple arrays (e.g., consider 3 or more) may be towed by a vessel and multiple vessels (e.g., consider 2 or more) may be operational during the survey. As an example, a method can include adjusting seismic data reflected by one or more geological interfaces located below a seabed for one or more errors. For example, consider one or more of the following errors that can occur in the seismic acquisition: lateral and vertical position of the node, lateral and vertical position of groups of sources, clock drift of each node and temporal changes in the acoustic velocity of the water between the sources and nodes.

As an example, during a survey or surveys, a substantial portion of shots may be acquired when the distance between the source and the node, when their positions are projected onto the same horizontal plane, is less than approximately three times the node depth. As an example, the system 600 may be utilized given such conditions and, for example, execute one or more methods to provide particularly accurate results. However, in various instances, a substantial portion of shots may be acquired at a distance larger than approximately three times the node depth. In such instances, the system 600 may be utilized to address such conditions and, for example, execute one or more methods to provide particularly accurate results.

As mentioned, a system may include a component that can address clock drift, which tends to be an issue specific to OBN surveys, particularly in the processing of OBN survey data. One or more aspects of the system 600 may be utilized, for example, when the OBN survey is combined with towed marine surveying (e.g., towed receivers as streamers), which may involve acoustic repositioning using systems based upon intrinsic ranging by modulated acoustics (IRMA). As an example, the system 600 may be suitable for use in one or more types of seismic surveys.

As mentioned, a system can provide features that can adjust seismic data reflected by one or more geological interfaces located below the seabed for various types of errors that may occur in a seismic acquisition scheme (e.g., lateral and vertical position of the node, lateral and vertical position of groups of sources, clock drift of each node and temporal changes in the acoustic velocity of the water between the sources and nodes, etc.). As an example, a system may be utilized to estimate one or more parameters through a linearized inversion of traveltime of a direct wave between one or more sources and one or more nodes.

As an example, the system 600 may provide the three components 610, 620 and 630 to improve estimation of parameters that can be utilized in OBN seismic processing, which can include 4D processing. As explained, the component 610 can provide an improved clock drift solution that uses calendar time and measured clock offset as may be measured by an onboard clock calibration procedure that can be conducted prior and after in-sea deployment of a node. As explained, the component 620 can provide for inversion for source parameters within a coordinate system related to a sailing direction of a source vessel while node position parameters are defined in a Cartesian coordinate system. As explained, the component 630 can provide one or more techniques that help to ensure that a linearized inversion provides a stable result through regularization.

As an example, a method can include minimizing a difference in an observed direct wave arrival and a modelled direct arrival traveltime(s) while solving for a change(s) in one or more parameters. Variations in water velocity may tend to be relatively small (e.g., differ less than a few percent, etc.). As an example, uncertainties in node position may tend to be relatively small (e.g., less than approximately 5 m in water depths of over 1000 m, etc.). In various instances, modelling can demonstrate that impacts of such variations tend to be relatively small on the direct wave traveltime and can lead to a suitable approximation by a linearized inversion.

The traveltime $T_{sr}$ between source at location $(x_s, y_s, z_s)$ and receiver at $(x_r, y_r, z_r)$ along its path l for a depth z and time-dependent is water velocity profile v can be given by:

$$T_{sr} = \int_s^r \frac{dl}{v(z, t_s)}.$$

In various instances, measured traveltime can also impacted by the clock drift $C_r$ and can be approximated for offset to seabed depth no greater than approximately three by the following equation:

$$T_{sr} = \frac{\sqrt{(x_s - x_r)^2 + (y_s - y_r)^2 + (z_s - z_r)^2}}{v(z, t_s)} + C_r(t_s).$$

As an example, a velocity profile may be obtained from one or more previous surveys in a common area, but may also be derived, for example, from sound velocity profiles (SVPs) obtained during the survey by one or more ROVs that plant and then retrieve nodes. SVPs can vary over time, for example, due to daily and seasonal changes in temperature and changing currents; consequently, a smooth average of the SVPs may be utilized for computation of traveltimes. As an example, in a large surveys (e.g., >100 km²), laterally variant velocity models may be considered.

Various types of clocks have been used in OBNs with atomic clocks being the most accurate, expensive, though they are often associated with a relatively high level power consumption. Clock drift tends to mostly originate from a difference of real clock frequency from nominal clock frequency (e.g., frequency offset) and may be caused by factors such as, for example, imprecise clock calibration and temperature effects. Over time, the frequency offset can accumulate in observable time drift where a constant-frequency offset may result in a linear clock drift and where a linear frequency drift can result in a quadratic clock-drift function in time.

A survey can involve synchronization or calibration of a node clock with GPS time, for example, prior to underwater deployment at time $t_{d,m}$ when a clock offset of $T_{d,m}$ can be measured. Additionally or alternatively, after retrieval from the sea bottom, a node clock can be calibrated with GPS time at time at time $t_{r,m}$ where a clock offset of $T_{d,m}$ can be measured. In various instances, the calendar time of the moment of calibration can be available as well as the offset of the clock. As an example, after data recovery, a linear clock drift correction (e.g., an adjustment) may be applied to at least a portion of the data. For example, consider a linear correction $T_m(t)$ to seismic data of the $m^{th}$ node according to the following example equation:

$$T_m(t) = (T_{r,m} - T_{d,m})(t - t_{d,m})/(t_{r,m} - t_{d,m})$$

Figure 7:
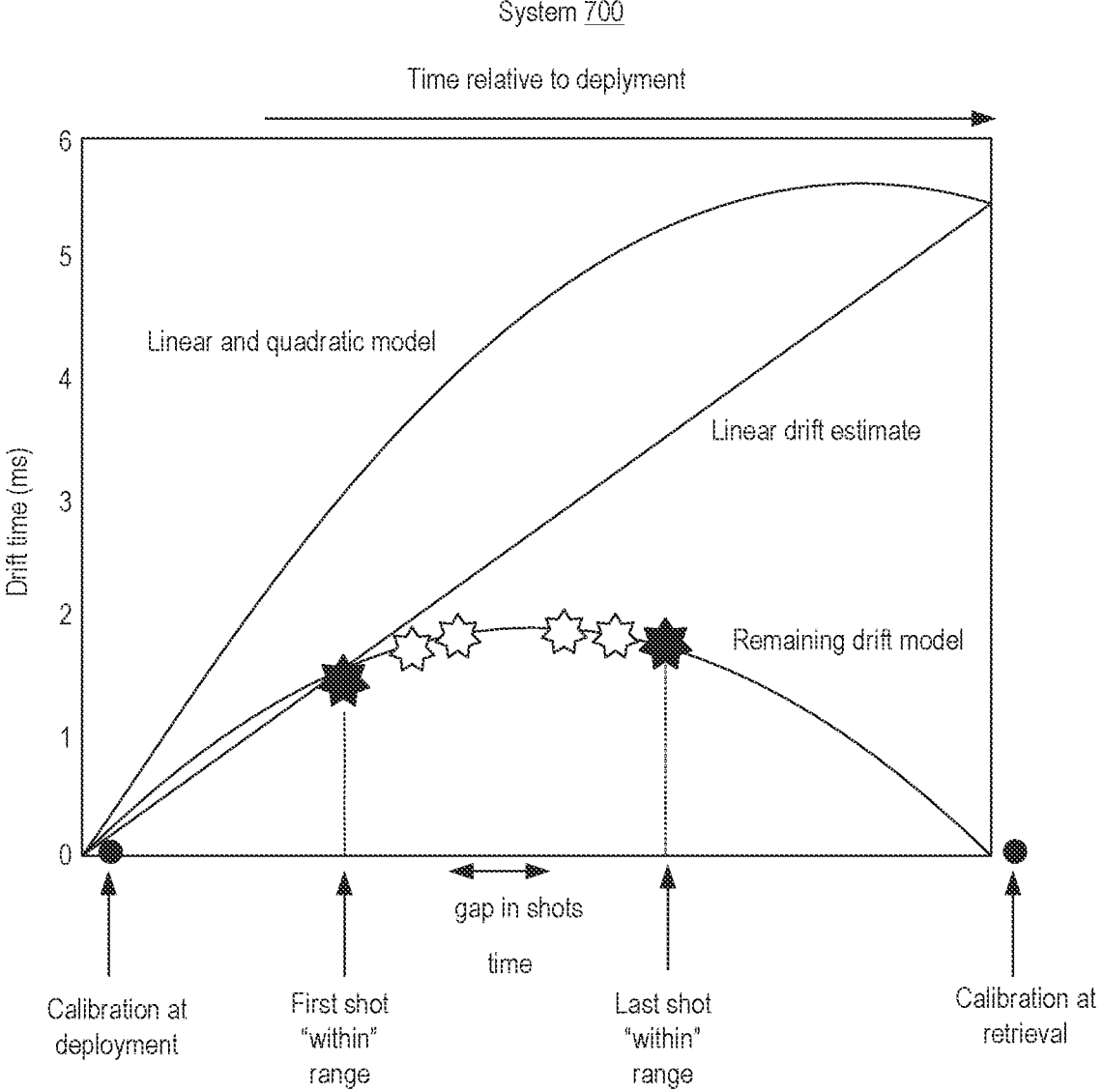
FIG. 7 illustrates an example of a system.

FIG. 7 shows an example diagram 700 that shows a linear clock drift estimate, a linear and quadratic clock drift model curve and a remaining drift model. In the example of FIG. 7, curves start and end at the node calibration time (e.g., before and after deployment). In the example of FIG. 7, stars indicate the time period over which picks are available for a node. As to inversion for source position, see further below.

As an example, a source position can be measured using GPS antennas located on surface floats from which sources are suspended and towed behind a vessel. Variations in cable lengths and the vertical offset between floats and an actual source may result in a difference of the position of the center of the seismic energy with the reported source position. As an example, a method can include estimating such differences by expressing them as the inline $(ds_i)$ and transverse $(ds_t)$ displacement of the source with respect to the vessel direction. As an example, a method can model and invert multiple sources and source vessels separately.

As an example, direct arrival traveltimes can be inverted using a linearized inversion in the form of a matrix equation:

$$Ax = b.$$

Above, vector b includes the differences between the observed $T_{sr}'$ and modelled $T_{sr}$ traveltimes for each source-receiver pair:

$$b = [T_{sr}' - T_{sr}].$$

In the matrix equation, the vector x includes the changes in the model parameters:

$$x = [dx_r, dy_r, dz_r, dc_{0,r}, dc_{1,r}, dc_{2,r}, dv(t_s), ds_i, ds_t, dz_s],$$

Above, the matrix A includes the partial derivatives of the modelled traveltimes with respect to the model parameters x, $$\frac{\partial T_{sr}}{\partial x_i}.$$

In such an example, each row of this set of linear equations relates the observed traveltime $$T_{sr}'$$

to the modelled traveltime and the partial derivatives to its model parameters:

$$\sum_{i=1:n}^{n} \frac{\partial T_{sr}}{\partial x_i} dx_i = [T_{sr}' - T_{sr}].$$

The resulting matrix A can include many more rows (millions of traveltimes) than columns (thousands of parameters) and, hence, be referred to as being sparse. As an example, a linearized inversion can be solved using the one of various solvers such as, for example, the LSQR algorithm solver (see, e.g., Paige, C. C., and Saunders, M. A., 1982, LSQR: An algorithm for sparse linear equations and sparse least squares: ACM Trans. Math. Software, 8, 43-71, which is incorporated by reference herein).

As an example, an inversion can be regularized by inverting the parameters over the time windows that include multiple shots. In such an example, each node can be inverted for a single survey-wide position error, whereas, its residual clock drift may be approximated, for example, using a parabolic function. As to water velocity variation, a method can include, for example, estimating with an assumption that it is constant over a substantial number of shots (e.g., consider a period of time spanning hours). As an example, source position can be inverted for groups of shots emitted by the same physical source at contiguous times. Such an approach can be quite useful as shots outside a receiver grid may not be readily resolved individually.

As to clock drift, as an example, a quadratic model of clock drift of each node may be implemented as follows:

$$T_m(t) = c_{2,m}(t - t_m)^2 + c_{1,m}(t - t_m) + c_{0,m}$$

Above, the coefficients $c_{2,m}$, $c_{1,m}$ and $c_{0,m}$ can be node dependent. Such an algorithm can allow for inversion for each of the four terms separately or a reduced set when the clock drift calibration data are available and a linear clock drift corrections has already been applied to the data prior to picking.

A clock drift function can depend on the calendar time t and can be calculated relative to time $t_m$ which is the reference time for each node. The calendar time may be input in GPS seconds and may be internally scaled to the fraction of days to assure numerical stability (e.g., consider computations using an INTEL MKL PARDISO solver). Such scaling may also be available in MATLAB code; noting that the MATLAB LSQR solver may proceed without. The unit of the clock drift $T_m$ can be in seconds as can be the unit for the coefficients $c_0$. The unit of $c_1$ can be in seconds/day and the unit of $c_2$ can be in seconds/day$^2$.

As an example, a linear clock drift correction can be defined as:

$$t' = t - T_{m,t_{d,m}} - \left(T_{m,t_{r,m}} - T_{m,t_{d,m}}\right)(t - t_{d,m})/(t_{r,m} - t_{d,m})$$

Above, t' is the corrected time and $T_{m,t_{d,m}}$ and $T_{m,t_{r,m}}$ the measured time delays at the clock calibrations conducted at deployment time $t_{d,m}$ and retrieval time $t_{r,m}$. An example of a quadratic clock drift function before and after applying the linear clock drift correction is shown in FIG. 7.

As an example, a clock drift function can be used to estimate the clock drift for times not included in a pick database. As an example, consider two scenarios: first the clock drift function can be applied to data from shots within the time range of the picks but outside the offset range (e.g., picks within the data base that may have an offset to depth ratio smaller than 3) where, in this case, it may be expected that the clock drift function provides an accurate estimate as the estimated clock drift can be viewed as an interpolated result; and second, the clock drift function can be applied to picks outside the time range of the data base which can be viewed as an extrapolation where, in this case, the solution can be improved when node clock calibration data are available.

Figure 8:
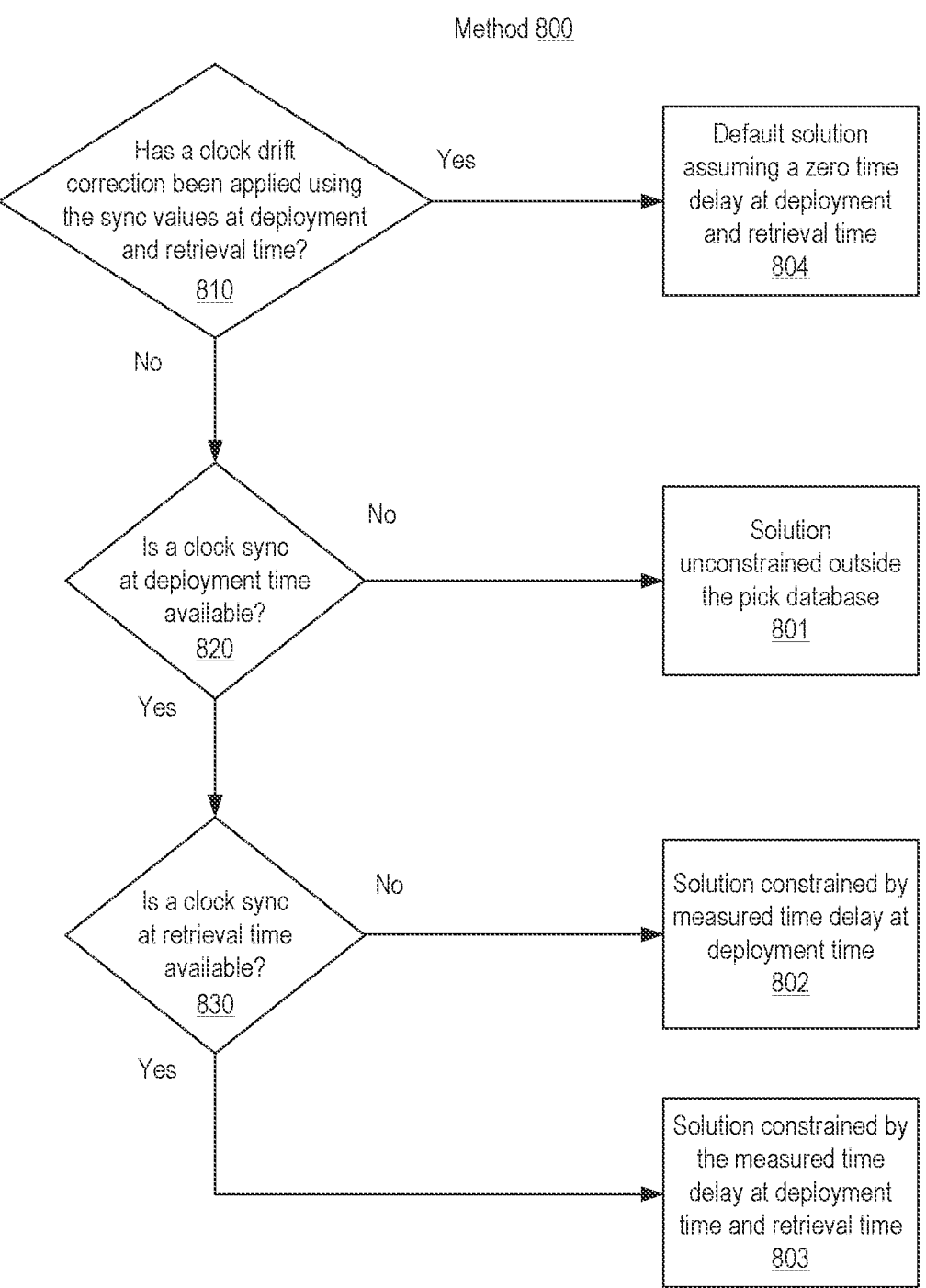
FIG. 8 illustrates an example of a method.

FIG. 8 shows an example of a method 800 where various approaches may be utilized. For example, the method 800 shows that four different solutions may be available with different accuracy depending on which calibration data are available.

In the example of FIG. 8, the method includes three decision blocks 810, 820 and 830 that provide for decision logic as to the four approaches in corresponding blocks 801, 802, 803 and 804. In the example of FIG. 8, each of the blocks can represent a clock drift processor (also see, e.g., FIG. 14, block 1440 and FIG. 15, block 1540).

As shown, the decision block 810 pertains to the clock drift and one or more adjustments using synchronization values at deployment time and at retrieval time, where, if met ("yes" branch), the method 800 continues to the approach of block 804. Where the condition is not met ("no" branch) in the decision block 810, the method 800 continues to the decision block 820.

In the example of FIG. 8, where the decision block 820 indicates that the condition is not met, then the method 800 can proceed to the block 801 (e.g., solution is unconstrained outside the pick database); whereas, if the condition is met, then the method 800 can proceed to the decision block 830. As shown, where the decision block 830 indicates that the condition is not met, then the method 800 can proceed to the block 802 (e.g., constraining a solution by the measured time delay at deployment time). Where the conditions of the decision blocks 820 and 830 are met, then the method 800 can proceed to the block 803 (e.g., constraining a solution by the measured time delay at deployment time and at retrieval time).

In the method 800, while the terms deployment time and retrieval time are utilized, these can be, generally, a pre-acquisition time and a post-acquisition time, respectively. In various instances, where equipment can be interrogated and/or calibrated in place prior to acquisition and/or after acquisition, actual deployment and/or retrieval of equipment from the bed of a water body may not be necessary. For example, consider a ROV that can move from node to node to perform one or more tasks, which can include interrogation to retrieve data and/or clock calibration. In such an example, a number of surveys may be performed while using already deployed equipment and/or without retrieving deployed equipment.

As explained, a method, a system, etc., can provide for one or more of different clock drift solutions depending on the availability of node clock calibration data.

As to the approach of the block 801, it can be for an unconstrained inversion for $c_0$, $c_1$, and $c_2$. Such an approach can involve an unconstrained quadratic clock drift function for picks within a database. In the approach of block 801, a solution may be derived without use of clock synchronization data. Within such an approach, time $t_m$ can be the earliest shot within the picking database for each node m. Such an approach can accurately describe the clock drift at the pick times; however, it can be less accurate when applied to shots outside the time range of the picks for this node (e.g., long offset data) as the quadratic term may become large dominate a solution. Such an approach therefore gives, for times outside the time range present in the database, a constant correction value equal to the nearest value within the database:

$$T_m(t < t_{d,m}) = T_m(t_{d,m})$$

$$T_m(t > t_{r,m}) = T_m(t_{r,m})$$

As to the approach of the block 802, it pertains to an inversion constrained by the deployment time delay. Such an approach can include assuming that time calibration at deployment time was conducted for each node and that the calendar time of calibration and the measured time delay are available. In such an approach, the calibration at retrieval time is not available, for instance because the node ran out of battery before retrieval. The approach of the block 802 may apply to part of the nodes within the survey.

As an example, in the block 802, $t_m$ can be the node deployment calibration time $t_{d,m}$ and $c_{0,m}$ can be equal to the measured time delay $T_{d,m}$ at $t_{d,m}$. In such an example, the clock drift function can be represented as follows:

$$T_m(t) = c_{2,m}(t - t_{d,m})^2 + c_{1,m}(t - t_{d,m}) + T_{d,m}$$

Above, the clock drift function at $t_{d,m}$ is thus equal to $T_{d,m}$. However, as the solution is not constrained by a retrieval time calibration, the quadratic term may dominate the solution for calendar times after the last pick for each node within the data base. Such data can have the time correction of the last pick within the database for each node applied:

$$T_m(t > t_{r,m}) = T_m(t_{r,m})$$

As to the approach of the block 803, an inversion can be constrained by the deployment time delay and by the retrieval time delay. In such an approach, it can be assumed that the time calibration at the nodal deployment time (e.g., pre-acquisition time) and retrieval time (e.g., post-acquisition time) were conducted and that the calendar time of calibrations and the measured time delays are available. It may be further assumed that the data have not yet been adjusted using the calibration data. In the block 803, a solution can be given by the following equation:

$$T_m(t) =$$

$$c_{2,m}(t - t_{d,m})^2 - c_{2,m}(t_{r,m} - t_{d,m})(t - t_{d,m}) + \frac{(T_{r,m} - T_{d,m})}{(t_{r,m} - t_{d,m})}(t - t_{d,m}) + T_{d,m}$$

In the approach of the block 803, at the deployment and calibration time this solution can be equal to the measured time delays $$T_m(t_{d,m}) = T_{d,m} \text{ and } T_m(t_{r,m}) = T_{r,m}.$$

This solution can therefore be appropriately applied to data acquired outside the time range of the pick database, which, by definition, is inside the deployment and retrieval time range.

As to the approach of the block 804, it can involve inversion with a linear clock drift correction applied. Such an approach may be taken as a default solution of a simultaneous water velocity, clock drift and position estimation (SWE) approach where it can assume that the linear clock drift correction has been applied to the seismic data prior to event picking and that the deployment and retrieval calibration times are available. The approach of the block 804 can be equal to that of the block 803 where the third and fourth term on the right hand side are zero, $$T_{d,m} = T_{r,m} = 0:$$

$$T_m(t) = c_2(t - c_{d,m})^2 - c_2(t_{r,m} - t_{d,m})(t - t_{d,m})$$

As in the approach of the block 803, two clock drift parameters are to be determined. The approach of the block 804 can appropriately be applied to data acquired outside the time range of the pick database as it converges to zero at the deployment and retrieval calibration time.

FIG. 9 shows example plots 910 and 930 where true (solid lines) and estimated (dotted lines) clock drift functions for an eight node Atlantis1 synthetic data set are presented. In the example of FIG. 9, linear clock drift correction was applied to the data prior to SWE and Gaussian random noise with a standard deviation of 0.4 ms was added to the picks. The triangles indicate the time for the first and last shot available for each node while their color indicates the node. In the plot 910 (Case 1) the clock drift estimate is shown and in the plot 930 (Case 4) the clock drift estimate is shown. In the example of FIG. 9, little difference (<0.1 ms) exists between the solutions for the time range between the first and last shot of each node.

In the plot 910, the solution deviates from the true solution at times before the first shot and after the last shot and in the plot 930 the solution converges to zero at the node deployment and retrieval times.

As to source inversion, consider inline Si and transverse St source position shifts that can be defined with respect to the reported source position (XCORD_SOURCE, YCORD_SOURCE) and the vessel heading α, which are shown in example diagrams 1010 and 1030 of FIG. 10 and given by:

$$Sx = \text{XCORD\_SOURCE} + Si * \cos(\alpha) - St * \sin(\alpha)$$

$$Sy = \text{YCORD\_SOURCE} + Si * \sin(\alpha) + St * \cos(\alpha)$$

Such a method also allows for inversion for the vertical source displacement, Sz. Such an implementation of the vertical displacement can be akin to inversion for vertical receiver position. In the example of FIG. 10, the Sz axis is positive downwards and Si, St and Sz axes together form a left handed coordinate system.

FIG. 10 shows the example diagrams 1010 and 1030 as illustrating the relationship between the inline transverse source coordinate system with node coordinate system.

To limit the number of inversion parameters and to provide stable estimates, groups or bins of sources can be jointly inverted for common Si, St and Sz. The sources within a bin can share the same source (e.g., a flip and a flop source from the same vessel are inverted separately) and sail line and can be close in source time and heading.

As explained, clock calibration may occur on a vessel prior to deployment to a water bed, which may be via a ROV, ROVs, a cable, cables, etc. Such clock calibration can be referred to as calibration at time of deployment or pre-acquisition calibration. Clock calibration at retrieval can be performed on a vessel once the receivers have been retrieved, which may be referred to as a post-acquisition calibration. As an example, where receivers can remain in place and be calibrated pre-acquisition and/or post-acquisition, one or more of such calibrations may be utilized. For example, consider a ROV that includes circuitry that can calibrate receivers via wired and/or wireless communication. In such an example, a ROV may dock on a receiver, for example, to establish a connection where circuitry of the ROV can perform one or more calibration and/or data acquisition tasks.

As an example, an inversion can be a simultaneous inversion for values of multiple model-based parameters (e.g., a simultaneous joint inversion). In such an example, for deep water surveys, parameters can include water velocity and clock drift; noting that receiver (e.g., node) position and/or source position may also be included in a simultaneous inversion or, for example, a subsequent inversion.

In a MATLAB framework implementation of the SWE (simultaneous water velocity, clock drift and position estimation) approach provides for detection of reshoots along the same sail line based on source time and vessel number. If a reshoot is detected, the algorithm can break up the sail line into two new sail lines that each are acquired by a single vessel and within a short period of time. The majority of sail lines in a survey tend to have a near constant heading, however near obstructions the heading may change rapidly.

The SWE approach detects a heading change along the sail line when the heading changes more the approximately 5 degrees from the start of the sail line. The SWE approach can then break up the sail line into two or more segments each with its own sail line number. In order to successfully minimize the traveltime residual, rapid heading changes around obstructions may result in very small bins with a dozen sources. As a result, there may be around an order of magnitude more source inversion parameters compared to shallow velocity parameters as each source array can be inverted separately for three parameters and short bins are demanded along sail lines with rapid heading changes.

As an example, an inline source shift Si may be expected to be stable during acquisition and may be attributed to an unrecorded offset difference between the vessel and the center of the source. While Si may be stable for a particular source array, it may be expected to vary between sources arrays and vessels.

Analysis of the transverse source shift St for flip flop and nearby opposite direction sail lines may provide further insights. An unrecorded transverse offset between the vessel and the center of the source can result in constant St for a particular source irrespective of sail direction but may vary between sources. Flip and flop sources in a transverse current can have a similar transverse source shift. Furthermore, when the vessel is sailing in the same current but in opposite direction the transverse source shift can have the opposite polarity. For rapid heading changes around obstructions a positive St value has been found for clock wise heading change while a negative St value was found when sail line counter clock wise. Vessels within the same survey showed large variation in St magnitude for such header changes (e.g., 0.5<St<5 m) for a heading change of approximately 5 degrees within the bin. In general, the bin length for St and Si may be hours, except where in the presence of such rapid heading variations where the bin length may become minutes. Inversion for the vertical source position can also be conducted for source bins. Changes in the vertical source position are expected to be related the source array and to tides. In order to capture changes to the source array configuration, the length vertical source bin may be set to equal the sail line. In order to capture tidal movement, the vertical source bin may be set to be considerably shorter than approximately 6 hours.

Figure 11:
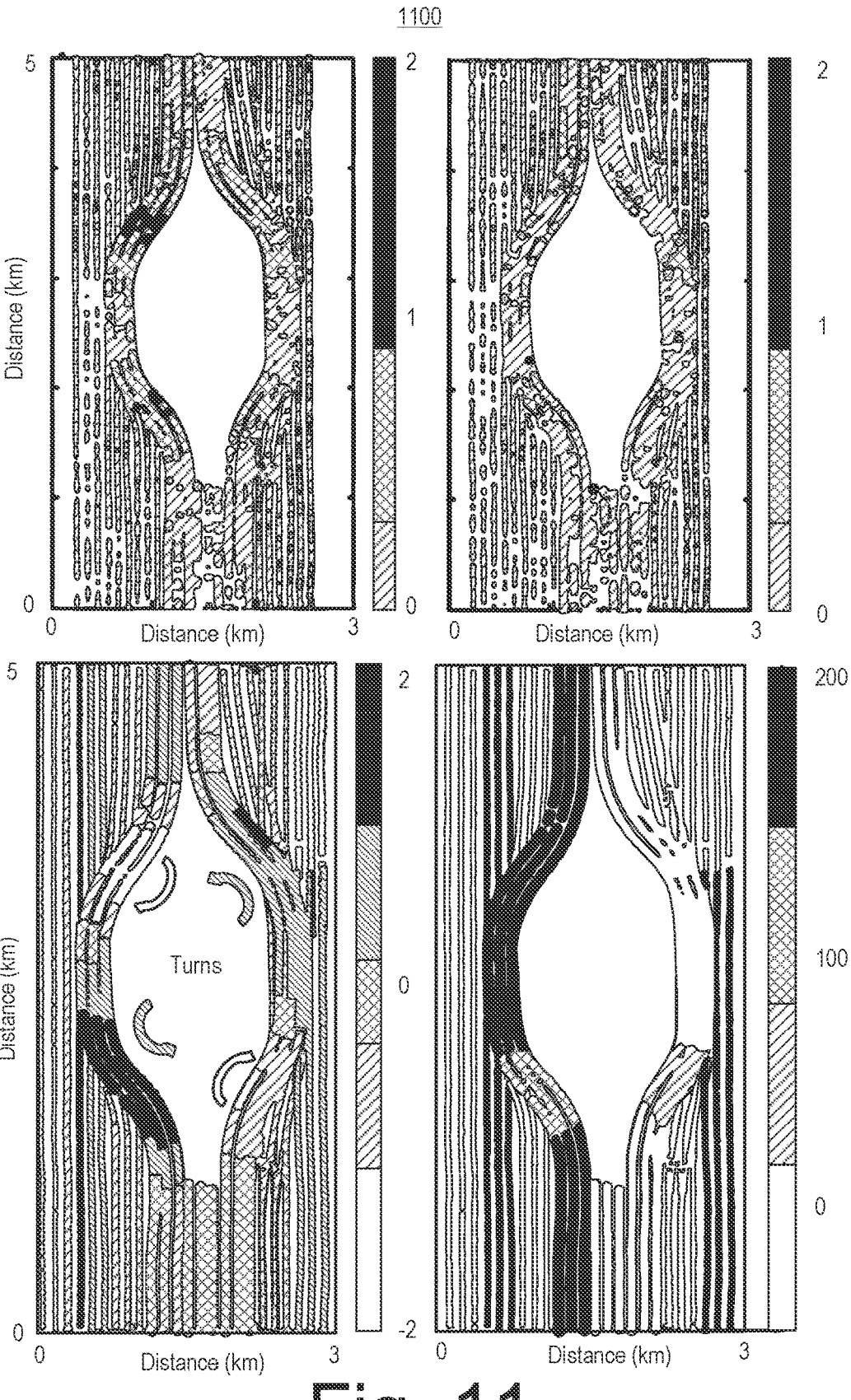
FIG. 11 illustrates example plots.

FIG. 11 shows a series of plots 1100, which may be part of a graphical user interface (GUI) (e.g., rendered to a display operatively coupled to a computing system, etc.). In the upper left plot, a close-up of the traveltime residual in milliseconds after joint inversion using source-line-long bins is shown; and, in the upper right plot, values are shown using the modified source binning based on heading. As to the lower left plot, it shows the transverse source shift in meters obtained by the joint inversion result shown in the upper right plot where the arrows indicate the turn directions (see label "turns"). The lower right plot shows the source line heading in degrees where zero degrees is north.

FIG. 11 shows real data example processing results where direct arrival data were inverted for various parameters. In the example of FIG. 11, the inline source shift was found to vary between 1 and 2 m towards the vessel, depending on the source. The transverse source shift was found to have a predominantly positive sign on source lines with a heading of predominantly 0°, while, on source lines with an opposite heading (180°), the transverse source shift has a predominantly negative sign of under a meter. Such a situation may be caused, for example, by a misalignment between GPS antennae and the subsurface center of seismic energy of a source. While the joint inversion greatly reduces the data residuals, the source lines closest to obstructions showed relatively large data residuals (see upper left plot). As these source lines showed substantial changes in heading near the obstructions, a binning scheme was implemented that reduced the bin size if a rapid change in heading was detected along a source line. Joint inversion using the binning scheme reduced the data residuals on the source lines near the obstructions to the level observed on the straight source lines (see upper right plot). Furthermore, it can be observed on the source lines close to the obstruction (see lower left plot) that, when the source turns (as shown by the change in its heading in the lower right plot), the direction of the transverse source shift is inwards relative to the reported source position. A negative transverse shift is observed for a clockwise turn, while a positive value is observed for a counter-clockwise turn. Such an observation can be explained by the centrifugal force that acts on an underwater air-gun array when the source vessel changes direction rapidly along with flexible source rigging.

As to rank deficiency and regularization, an inversion can be performed by solving a linear system of equations that does have many more traveltime measurements (rows in the matrix equation) than unknowns (columns). However, it is not guaranteed that this system of equations is overdetermined or degenerated without a unique solution or robust solution. A measure of the non-degenerateness of the system of linear equations can be obtained through rank analysis of the matrix that represents the linear system of equations. Some example cases were identified where each result in rank deficiency and solutions to make the system full rank are described.

Joint inversion for the vertical position of the source and node results in a rank deficiency. The system of equation becomes full rank when an equation is added that requires the mean of Sz to be zero. This may be implemented survey wide or for each physical source separately. This condition sets the average of the reported source depth as reference depth level of the solution. This tends to be a better approach than demanding that the average node depth is zero as the reported node depth is influenced by the water velocity model and method used the contractor.

Joint inversion of lateral source displacement Si and St in combination node displacement Rx and Ry reduces the rank by 2 (one of each direction). There are a large number of approaches that can be applied to resolve such scenarios. For example, consider one or more of the following:

Inversion of survey wide time invariant Si and St solution for each source array separately.

Creating source bins that have a minimum bin length of twice the average (or maximum) sail line length. Hence, each bin will have a more or less equal number of sources in opposite direction. These larger bins with shots from multiple sail directions are expected to have a reduced magnitude of St in the presence of currents as currents are expected to induce a lateral source shift independent of the sail direction.

Source bins are typically created as a segment of a sail line. The system of equations becomes full rank when at least one source bin contains at least two shots from the opposite sail direction. These selected two shots can be taken from any position within the survey and may be located on the survey edge where they would little contribute to the final seismic image.

As to some other examples, consider one or more of:

Add equations that damp the position solution for each source and/or node to zero: Si=0, St=0, Rx=0, Ry=0. Strong damping may result in a non-optimal solution.

Adding an equation that requires that the mean of Si=0 and another equation that requires that the mean of St=0. There are further choices here to make like is it applied to each source separately, or all together. Furthermore, this equation can be applied in the inline-transverse source position coordinate system or in the x-y coordinate system. This zero source shift condition has the drawback that the true solution may be non-zero resulting in a non-optimal solution. This may happen for instance with a survey wide non-zero Si shift due to incorrect rigging of the source array and its position system.

Adding an equation that requires that the mean of Rx=0 and another equation that requires that the mean of Ry=0. The zero mean condition is the disadvantage that the true solution may not be zero mean and therefore a non-optimal solution may be obtained. In addition, the typical user scenario is first an inversion for node parameters to enable QC'ing. This solution may have a non-zero mean in Rx and/or Ry. When the data passes the QC a full inversion for both node and source position may be conducted. This solution would have a zero mean for the node position. When comparing both inversions the user would observe an undesired shift in the node position.

Adding additional equations that damp the lateral gradient of Si and St solution. This condition will smooth the lateral variation in Si and St while allowing for a survey wide mean and trend. As smoothness cannot be guaranteed across the sources, separate equations for each source code are added to the system of equations. Furthermore, it may be considered to create separated equations for each source line.

As an example, a method can include scaling one or more regularization equations. While the scaling value may, at times, be a subjective choice, an approach can evaluate residual data misfit as a function of scaling values. A very low scaling value may result in having an equation on the solution which will have the lowest residual data misfit. Increasing the scaling value can result in an increase in data misfit. As an example, a user or machine can determine where the data are over fitted or no meaningful parameter estimation.

As explained, a system can provide for one or more types of clock drift processing. For example, consider FIG. 8 and the blocks 802, 803 and 804, as may be constrained by one or more calibration times. As an example, a system can provide for one or more coordinate transforms for source inversion, for example, as explained with respect to FIG. 9. As an example, a system can provide for various techniques that can make a matrix to be of a more full rank for source inversion and, for example, damping of clock drift.

In various instances, due to various factors, quality of ocean-bottom node (OBN) data can be compromised. For example, consider a number of acquisition-related errors including one or more of node position, clock drift, source position, and temporal variations in the water velocity. As an example, a system can generate estimates errors from direct wave arrival times where, for example, the estimated time-dependent velocity profile shows similar trends as nearby acquired pressure-induced echo-sounder-calibrated velocity data. As an example, a high-resolution estimate of source position can indicate that, in the proximity of obstructions, reported source position does not include a transverse shift that is caused by centrifugal force that acts on a source array.

As explained, quality of ocean-bottom node (OBN) seismic data acquired in deep waters can suffer from a number of specific acquisition-related perturbations. These perturbations can include node position and clock drift, temporal and spatial variations in water velocity, and source position errors. Nodes may become smaller, lighter weight, and be equipped with a longer battery life (e.g., consider 100 days under water). In various instances, an atomic clock may be utilized. Deployment of nodes has seen efficiency improvements. In shallow water, nodes on cable may be relatively rapidly laid out while, in deep water, multiple remotely operated vehicles (ROVs), aided by cameras, can provide for positioning of nodes. As an example, a method such as the method 800 of FIG. 8 may be implemented for deep water, shallow water, etc., where equipment may be separate nodes or nodes linked physically by cable, which may be non-electrical cable (e.g., not for node to node communication of data and/or power). In shallow water surveys, cable may be utilized to facilitate deployment and/or retrieval of nodes. While nodes may be utilized on beds other than ocean beds, the term "ocean" is utilized broadly to encompass bodies of water and their beds that can be other than oceans and ocean beds.

With the size (time and space) of surveys increasing, the likelihood for acoustic velocity changes within a water column increases. Such changes may be due to the seasons, prevailing currents, or abrupt meteorological events. Furthermore, between time-lapse surveys, different nodes with different clocks may be used. Minimizing the impact of these temporal changes on the seismic data can help improve time-lapse seismic surveys, whose value depends on accurate timing and positioning.

As to some examples of error, errors in node and source positions can be of the order of meters and temporal velocity variations of less than 0.5 m/s and clock drift result in traveltime errors equal to or larger than 1 ms. As explained, various techniques can account for clock drift and source position errors.

As explained, a method can include estimating four classes of perturbations that affect OBN surveys. For example, consider joint inversion of OBN data where the interdependency of the parameters can be analyzed through a correlation analysis, which can improve a data processing workflow.

Synthetics tests show that, within various assumptions, parameters can be well resolved. As explained, a subset of results from an 8-node synthetic test can be utilized to illustrate various issues and handling of such issues.

Figure 12:
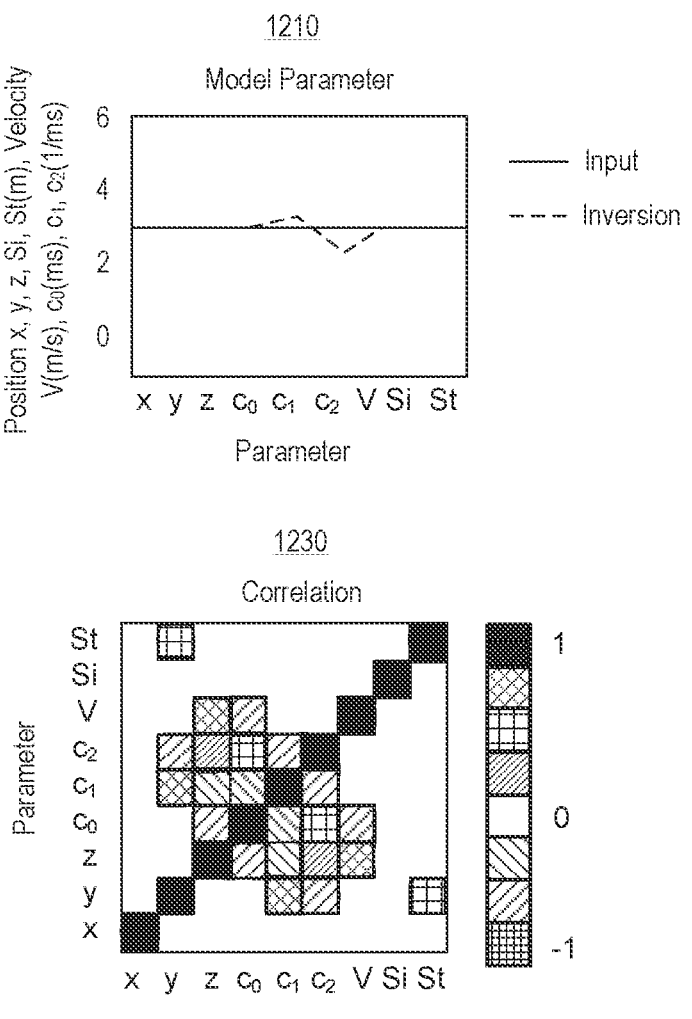
FIG. 12 illustrates example plots.

FIG. 12 shows example diagrams 1210 and 1230 of parameters and correlations where the diagram 1210 shows input and inverted model parameters for the 8th node of an 8-node synthetic test with results plotted in their respective units and where the true model parameters have a value of 3 in their measurement unit (e.g., m for position and ms for $c_0$) and where the diagram 1230 shows a correlation matrix that is obtained by the joint inversion for the parameters shown in the diagram 1210.

In FIG. 12, within this test, positions were changed by 3 m; a 3-ms velocity change was introduced and each of the clock drift parameters was changed by 3. The parameters were acceptably estimated with residual error less than 1 ms. Analyzing the correlation matrix shows that the strongest correlation exists between the node depth, velocity, and clock drift parameters. A different set of correlations exists between the y position of the node and the linear and quadratic clock-drift term. This correlation is related to the sail line direction, which is in the x-direction, and the shot time increases monotonically in the y-direction. In practice, the shooting pattern will often not increase monotonically in either direction due to infill and reshooting, thereby reducing the correlation between the y position of the node and the linear clock drift term.

Figure 13:
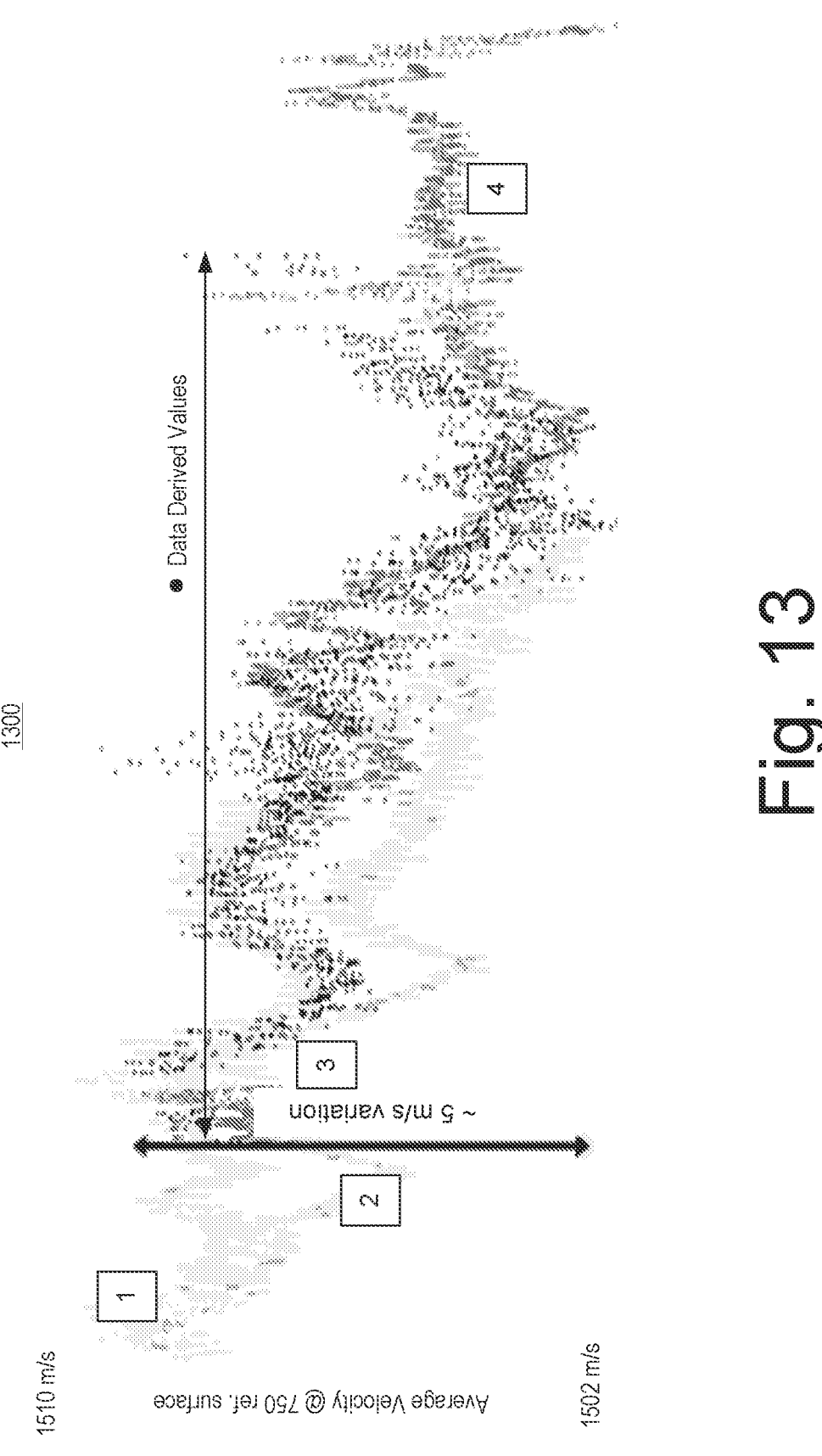
FIG. 13 illustrates example plots.

FIG. 13 shows an example plot 1300 that shows a comparison of the inverted average water velocity with the four deepest pressure-induced echo sounders (PIES), with locations and data labeled 1, 2, 3 and 4, referenced to constant 750-m surface. The data of FIG. 13 can be understood with respect to the data of FIG. 11.

The example of FIG. 13 uses real data from an OBN survey in the Gulf of Mexico that was acquired using two source vessels, each shooting with three sources. A total of 2048 nodes were deployed with an interval of 1200 m in water depths between 300 and 1300 m. Direct arrivals were picked in the data up to an offset of 3 km. An average water velocity model was derived from SVPs acquired during the survey. It was found that inverting the data for node position, clock drift, velocity, and source position reduced the average RMS of the traveltime difference from 0.85 ms to 0.23 ms. A comparison was made between the temporal variation in the water velocity within the top 750 m and pressure-induced echo sounder (PIES) measurements. The PIES were located on the boundary of the node grid and were separated by over 20 km from each other. The velocity in the upper 750-m part of the water column compares favourably with the velocity derived from the PIES data (see dark circles), in particular for data acquired near the PIES. The seismic data estimated, consistently with the PIES, the drop in the average seismic velocity that took place in two periods during this survey.

As explained, the inline source shift was found to vary between 1 and 2 m towards the vessel, depending on the source. The transverse source shift was found to have a predominantly positive sign on source lines with a heading of predominantly 0°, while, on source lines with an opposite heading (180°), the transverse source shift has a predominantly negative sign of under a meter. As mentioned, this situation may be caused by a misalignment between the GPS antennae and the subsurface centre of the seismic energy of the source.

Again, as explained with respect to the data of FIG. 11, it was observed that, while the joint inversion greatly reduces the data residuals, the source lines closest to obstructions showed relatively large data residuals (upper left). As these source lines showed substantial changes in heading near the obstructions, a binning scheme was designed that reduced the bin size if a rapid change in heading was detected along a source line.

As explained, a system can provide for joint inversion of the direct-wave arrival times for node position, source position, water velocity, and clock drift. Various examples show that each parameter set contributes to reducing the data difference. The estimated time-dependent velocity profile shows similar trends as nearby acquired PIES-calibrated velocity data. A high-resolution estimate of the source position indicates that, in the proximity of obstructions, the reported source position does not include a transverse shift that is caused by the centrifugal force that acts on the source array.

As an example, a method can include using traveltime differences for the estimation of perturbations in ocean bottom node surveys. Various factors such as, for example, hydrostatic pressure, temperature, salinity and barometric pressure, can affect the speed of sound in water (e.g., an ocean or another body of water). Such factors, which may vary spatially and with time, can cause distortions in seismic data that have been acquired at contiguous locations but at different times. The cumulative effects of these variations can be more substantial in offshore seismic exploration in deep waters.

As an example, a method can include compensating for one or more effects for both streamer and ocean bed (e.g., seabed, etc.) seismic acquisitions, optionally with reduced resource utilization. Such a method can enable estimation of one or more other classes of perturbations that can affect OBN acquisitions with autonomous receivers. For example, consider (residual) clock drift and receiver position errors.

As an example, a method can compensate for one or more effects of non-stationarity of ocean properties. Such a method can reduce demand for labor intensive traveltime picking as based on estimation of the time of arrivals of some parts of a seismogram (e.g., direct waves), which can also demand intensive processing to assess the validity of picked traveltimes. The absolute value of traveltimes depends on the shape of the waveform that varies with offset and azimuth of recorded data because the seismic sources do not, in general, emit an isotropic radiation pattern. Picked traveltimes can demand compensation of the anisotropic radiation pattern in early processing stages.

As explained, the speed of sound in a body of water (e.g., an ocean, etc.) can be referred as water velocity. As an example, a method can improve water velocity estimation, for example, in a manner that can overcome issues as to the estimation of water velocity variations and/or receiver position and/or clock drift in seabed acquisition with autonomous receivers (e.g., nodes). Such issues can demand picking of absolute traveltimes and compensation of the azimuth and offset-dependent seismic signature. As an example, a method can include utilizing traveltime differences between neighboring traces in a hyperspace (e.g., dimension greater than 3D such as 4D, 5D, 6D, etc.). Such a method can be performed without picking of absolute traveltimes.

As an example, a method can be suitably applied to a problem formulated as a linearized traveltime inversion for sake of simplicity; noting that a method can also be suitably applied for non-linear traveltime inversion.

The difference between the modeled and the picked direct arrival traveltimes for an OBN survey affected by receiver position errors, calendar time variations of the speed of sound in water and clock drift, can be written (first order approximation) as:

$$\sum_{j=1}^{n} \frac{\partial T_{mi}}{\partial x_j} dx_j = T_{mi} - T_{di}, \; i = 1, 2, \ldots m$$

where $T_{mi}$ are the direct arrival traveltimes modeled with a current model, $T_{di}$ are the picked traveltimes, $dx_j$ are the differences between the current and the appropriate (and unknown) model parameterized with n variables, $$\frac{\partial T_{mi}}{\partial x_j}$$

is the partial derivative of the $i^{th}$ traveltime with respect to the $j^{th}$ model parameter.

The number of picked traveltimes m is in situations of interest in seismic exploration is greater than the number of model parameters n. The parameterization of a model depends on type of survey (e.g., streamer or seabed) and acquisition geometry. For example, in the case of OBN surveys in deep water where the water velocity may change with time, the receiver positions provided by the acquisition may be inaccurate. The differences $dx_j$ include: the difference between the actual and modeled positions of the receivers, coefficients that model the clock drift that affects autonomous receivers and coefficients that capture the variability with time of the water velocity.

The over-determined system given above can be written in matrix notation as:

$$A_{mn} x_{n1} = b_m$$

where A, the matrix of the spatial derivatives, is sparse.

Given the equation in matrix notation form of the system, both sides of the equation can be multiplied by a rectangular matrix P that subtracts each possible combination of the rows of matrix A, to obtain a modified equation in matrix notation form of the system:

$$P_{tm} A_{mn} x_{n1} = P_{tm} b_m$$

In comparison, the modified equation, with respect to the non-modified equation, has the terms $T_{di}$ in $b_m$ replaced by $$T_{di} - T_{di+l}$$

in the known vector $$b'_t = P_{tm} b_m.$$

Hence, rather than having to pick absolute traveltimes, the modified equations utilizes estimates of traveltime differences between each possible of combination of traces used to build the known vector $b_m$. The modified equation therefore reduces computational burden.

Although the total number of possible combinations is $m(m-1)/2$, the number t is, in general, much smaller because "contiguous" traces in a 6D hyperspace created by the source and receiver locations can be used. If the source and receiver elevations are approximately constant, the traces used for the modified equation can be selected from a 4D hyperspace. Several methods for estimating traveltime differences between pairs of seismic traces and seismic arrays exist.

Other features of the modified equation can be deduced by analyzing the matrix $P_{tm} \cdot P_{tm}$ is the difference of two rectangular binary matrices and has two non-zero entries in each row. An example of $P_{tm}$ for a system with m=4, n=3 and with $m(m-1)/2$ possible combinations is:

$$P_{64} = \begin{bmatrix} 1 & -1 & 0 & 0 \\ 1 & 0 & -1 & 0 \\ 1 & 0 & 0 & -1 \\ 0 & 1 & -1 & 0 \\ 0 & 1 & 0 & -1 \\ 0 & 0 & 1 & -1 \end{bmatrix}$$

The normal equations associated with modified equation can be represented as follows (omitting the subscripts that denote the matrix sizes) as a system of normal equations:

$$A^T P^T P A x = A^T P^T P b$$

It may be noted that although $P^T P$ is singular, the system of normal equations is non-singular as long as the matrix PA is not rank-deficient. In the case that the matrix PA is rank-deficient, it can be augmented by adding one or more equations from the system as in the non-modified equation. This implies that a drastically reduced number of traveltime picks than solving directly the non-modified equation are demanded.

As to the modified equation, its rank status (e.g., whether it is deficient or not) depends on the matrix A. To provide an answer as to rank status, analytical expressions for the partial derivatives can be derived in the case that the model space is composed of perturbations in the three coordinates of the receivers, receiver consistent clock drift and calendar time variations of the water velocity (see further below). Then, the differential traveltime matrix P can be applied to it. An example provides clarity that, although the matrix of the partial derivatives for the differential delay may be rank deficient, even though the original matrix is not, and provides a solution to such situation.

The determination of the model parameter $c_0$ can be crucial because, as explained further below, the corresponding column of the partial derivatives contains elements whose values are either zero or one.

As an example, consider an example in which $c_0$ alone is to be estimated for 3 receivers where 4 traveltimes are available. In this example, two of these traveltimes were picked on the same receiver for different shots; consequently, the corresponding two rows of A are identical.

$$A = \begin{bmatrix} 1 & 0 & 0 \\ 1 & 0 & 0 \\ 0 & 1 & 0 \\ 0 & 0 & 1 \end{bmatrix}$$

As the rank of A is 3, the inversion for $c_0$ for the three nodes succeeds. The application of P produces the following matrix for the partial derivatives of the differential traveltimes:

$$PA = \begin{bmatrix} 0 & 0 & 0 \\ 1 & -1 & 0 \\ 1 & -1 & -1 \\ 1 & -1 & 0 \\ 1 & -1 & -1 \\ 0 & 0 & -1 \end{bmatrix}.$$

Above, the matrix PA has a rank of 2 and therefore produces a singular system of normal equations. To solve for $c_0$, the system of differential traveltimes can be augmented with one or more additional rows from the original system. In the example above, if PA is augmented with the first row from A, its rank becomes 3 and the least square problem has a single solution.

As explained, a system can be augmented with a number of equations, for example, a number equal to the number of clock drift biases $c_0$ to be estimated. As an example, where $c_0$ is to be estimated for all the receivers, an additional equation for each receiver can be added. In a simple case in which there is one shot that "illuminates" the receivers, a method can add picked traveltimes for that shot alone.

The modified equation has, in general, a condition number greater than the non-modified equation but the known vector in the modified equation is more accurate than in the non-modified equation because traveltime differences tend to be computationally easier to estimate in the presence of additive noise and slowly varying waveforms. The systems, as represented by the equations, can, in both cases, be preconditioned before application of a solver for a sparse linear system.

Figure 14:
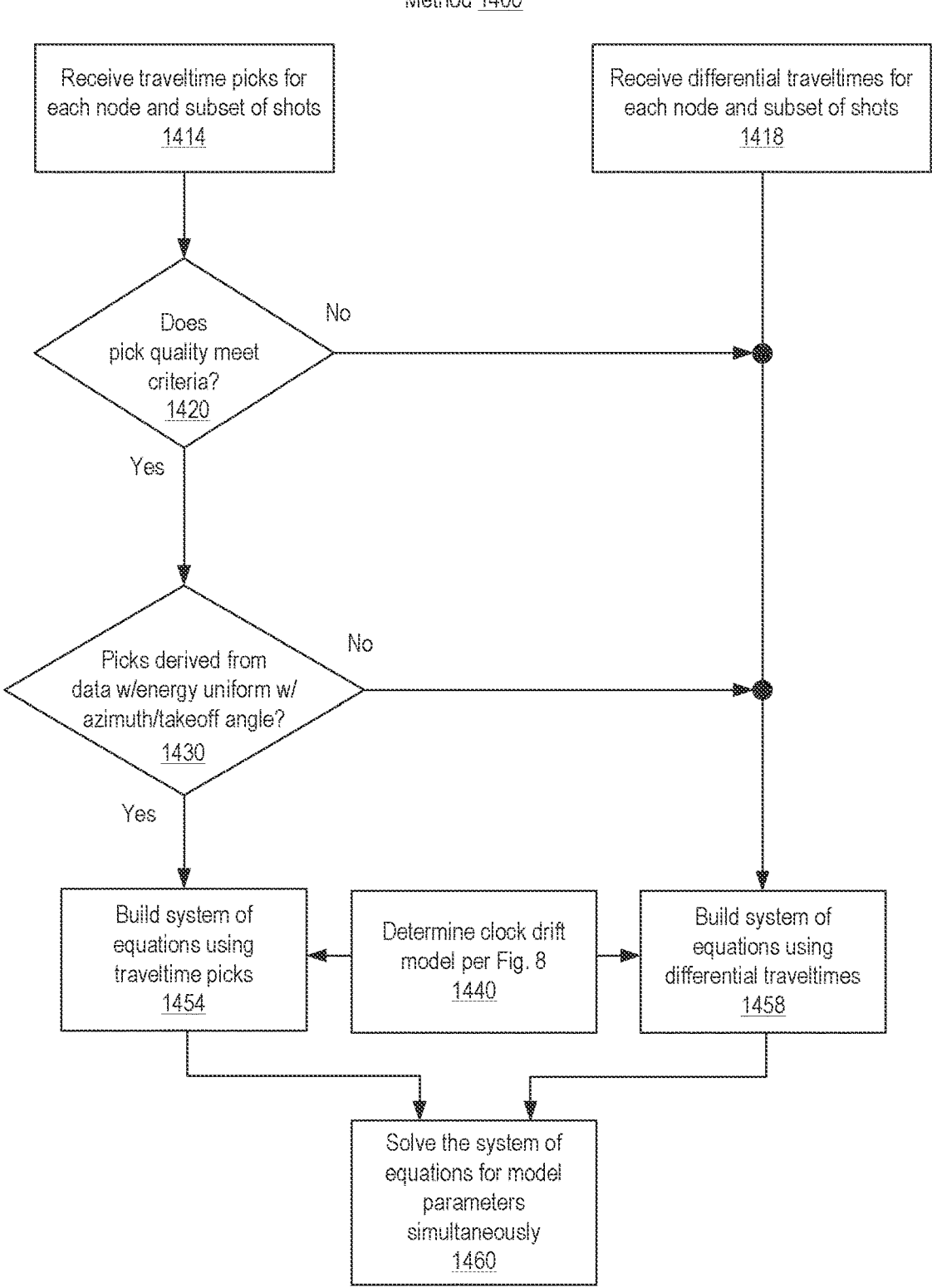
FIG. 14 illustrates an example of a method.

FIG. 14 shows an example of a method 1400 that includes a reception block 1414 for receiving traveltime picks for each node and subset of shots, a reception block 1418 for receiving differential traveltimes for each node and subset of shots, a decision block 1420 for deciding whether pick quality meets one or more criteria, a decision block 1430 for deciding whether the picks were derived from data whose seismic source energy is uniform with azimuth and takeoff angle, a determination block 1440 for determining a clock drift model (see, e.g., the method 800 of FIG. 8), a build block 1454 for building a system of equations using the traveltime picks, a build block 1458 for building a system of equations using the differential traveltimes, and a solution block 1460 for solving the system of equations for model parameters simultaneously.

As shown in the example of FIG. 14, where one or more of the one or more quality criteria are not met per the decision block 1420, the method 1400 utilizes the differential traveltimes and the build block 1458 and where one or more of the seismic source energy conditions are not met per the decision block 1430, the method 1400 utilizes the differential traveltimes and the build block 1458. As explained, a system of equations may be linear and/or non-linear.

Figure 15:
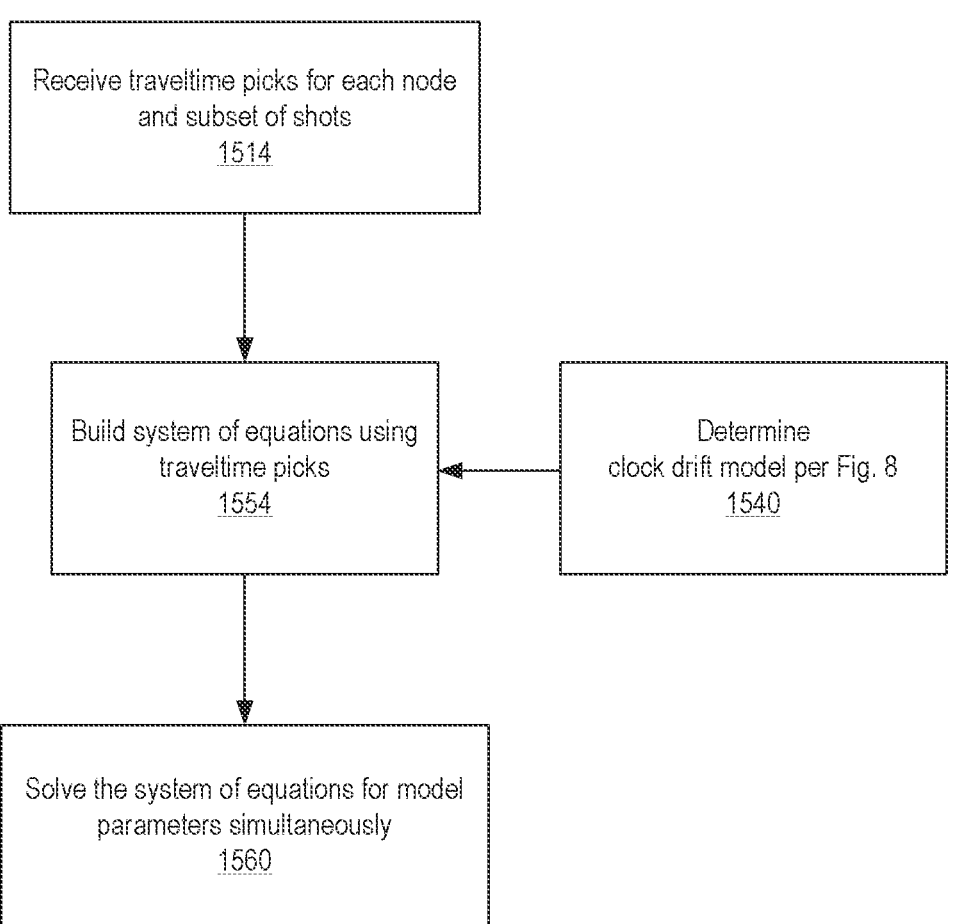
FIG. 15 illustrates an example of a method.

FIG. 15 shows an example of a method 1500 that includes a reception block 1514 for receiving traveltime picks for each node and subset of shots, a determination block 1540 for determining a clock drift model (see, e.g., the method 800 of FIG. 8), a build block 1554 for building a system of equations using the traveltime picks, and a solution block 1560 for solving the system of equations for model parameters simultaneously. As explained, a system of equations may be linear and/or non-linear.

As an example, a method was applied in a trial scenario based on an acquisition geometry derived from the Atlantis OBN surveys. Trials as to modeling and inversion demonstrate the impact of perturbations OBN position (x, y, z), clock drift (zero, first and second order, $c_0$, $c_1$ and $c_2$) and time variant water velocity variations.

The trial example, sources and receivers are deployed in hexagonal pattern with a receiver spacing of 473 m and a source spacing of 50 m where water depth was set to 750 m and a maximum offset/depth ratio of 2.5 was utilized. The water velocity profile was based on the Hood curve and divided into two layers where a shallow layer extended from the surface down to a depth of 500 m with a time variant velocity perturbation with a 1 m/s daily amplitude variation and a 1 m/s survey wide amplitude variation. Below 500 m (e.g., deep layer), the Hood profile was used for modeling and inverted for a stationary velocity change. Direct wave traveltimes were calculated for each source—receiver combination that met the offset criterion (e.g., maximum offset equals 1875 m). Initial trials showed that the accuracy of the traveltimes was sufficient accurate using a straight ray approximation. Each perturbation of the model parameters resulted in a traveltime variation of around 1-2 ms.

Figure 16:
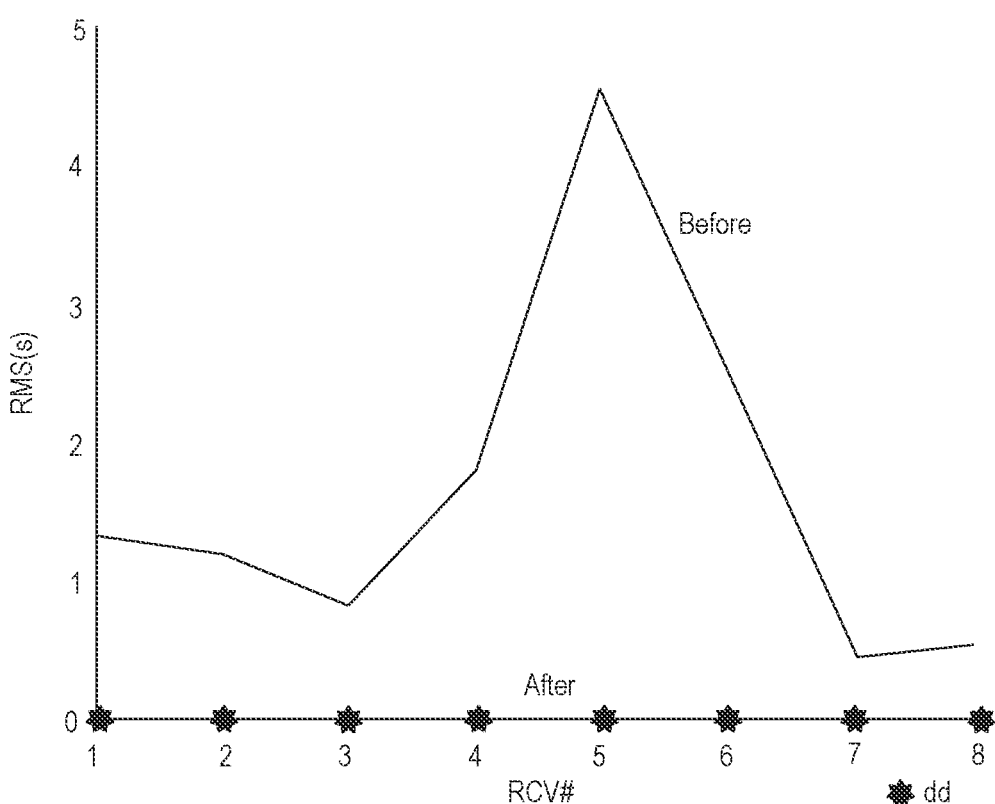
FIG. 16 illustrates an example plot.

FIG. 16 shows an example plot 1600 of root-mean square (RMS) of traveltime residuals for 8 receivers of the example. The plot 1600 shows values before inversion, after inversion with picked traveltimes (running substantially along the abscissa), and after inversion with differential traveltimes (see symbols).

Figure 17:
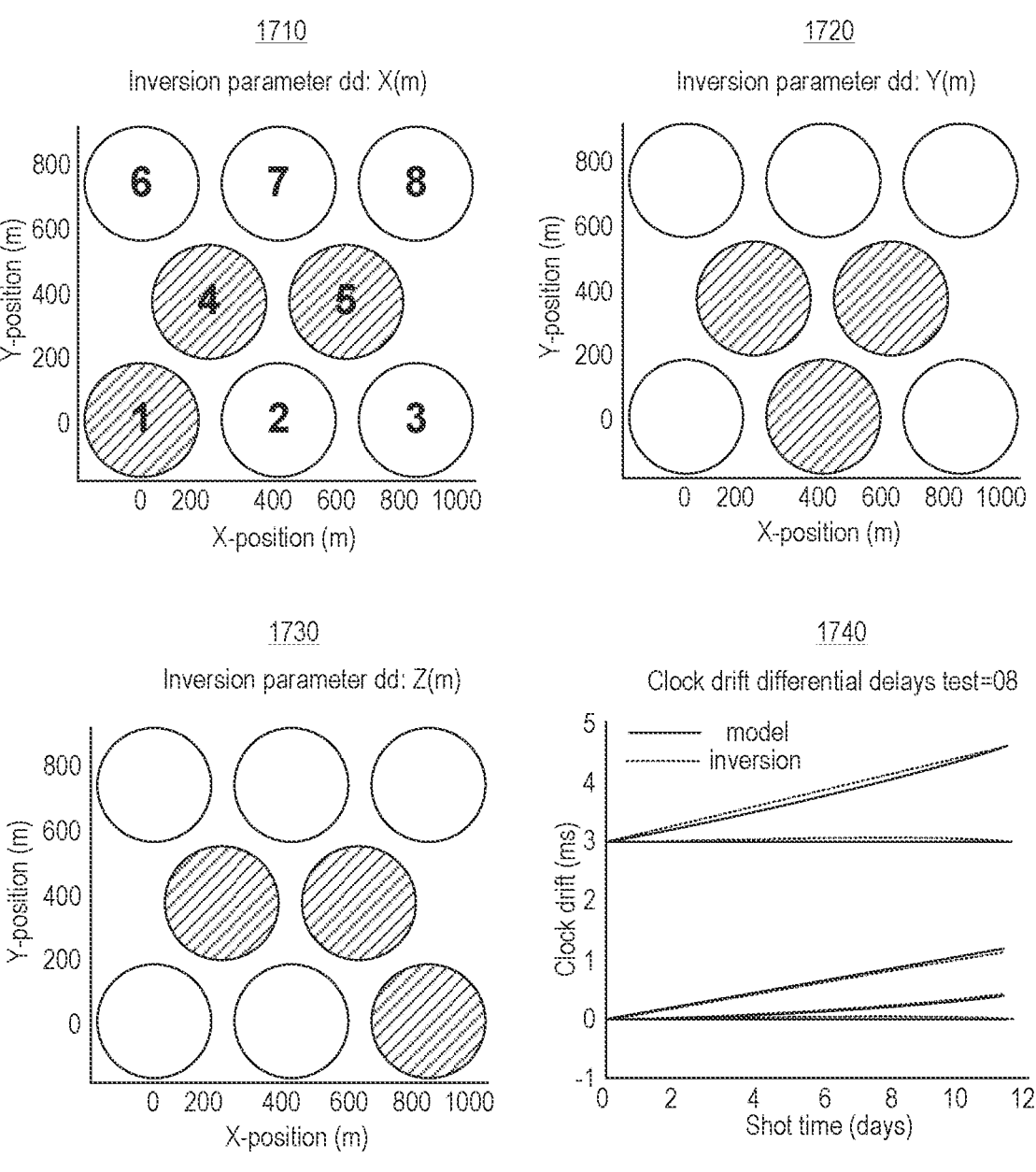
FIG. 17 illustrates example plots.

FIG. 17 shows plots 1710, 1720, 1730 and 1740 for results of inversion using differential delays for receiver-consistent model parameter. The plots 1710, 1720 and 1730 show receiver position variations (x, y, and z) and the plot 1740 shows clock-drift parabolic. The actual variations are +3 m for the x coordinates of the receivers 1, 4 and 5; +3 m for the y coordinates of receivers 2, 4 and 5; +3 m for the z coordinates of receivers 3, 4 and 5. The actual clock drifts for the modes are denoted by solid lines where the estimated clock drift for each corresponding receiver is indicated by a dotted line. In the plots 1710, 1720 and 1730, the cross-hatching indicates a value of +3 m; whereas, solid white indicates a value of approximately 0 m.

FIG. 18 shows example plots 1810 and 1830 for estimation of time varying water velocity variation. As indicated in the plot 1810, true values are shown by large dashes and inverted values are shown by a combination of dots and dashes. Estimation for of water velocity variation for the deepest layer. The plot 1830 is a bar chart that shows the true and inverted values, along with the difference.

In the trial example, the method recovered relevant parameters for an eight-node inversion. The results show that in the noise free case, the parameters are very well recovered. The results obtained with the differential traveltimes substantially the same as those obtained with the direct arrival traveltimes. As a single contiguous trace was used to build the vector of the differential traveltimes, the size of the problem did not increase substantially. The slight increase in the number of equations is due to the fact that in order to solve for the clock drift bias $c_0$, the system was augmented as described.

As explained, FIG. 16 shows the residual traveltimes before and after inversion from application of the example method. FIG. 17 shows the results of the inversion for the receiver consistent model parameters where 3 m position errors are recovered within 1 cm accuracy and where the resulting clock drift functions for each node are also almost perfectly recovered. FIG. 18 shows that the temporal velocity changes in the top layer are recovered over 10 min long time bins and follow adequately the modeled values; noting that a small offset in the shallow water velocity is the result of a trade-off between the shallow and deep water layer velocity.

As to analytic expressions of partial derivatives for traveltime inversion in OBN surveys, if ray bending in water is negligible, which is typically an acceptable assumption for offset to depth ratio less than three, traveltimes in an OBN survey can be represented as:

$$T_m = \frac{1}{\cos(\theta)}T_v + c_0 + c_1 t + c_2 t_i^2$$

where $$T_v = \int_{s_z}^{r_z} p_m(z, t)dz$$

is the vertical traveltime, $p_m$ is the slowness (inverse of velocity) of sound in water, $c_0$, $c_1$ and $c_2$ are the coefficient of the residual drift modeled with a parabolic approximation, $\theta$ is the ray angle with respect to the vertical, $t_i$ is the acquisition (calendar) time.

From the acquisition geometry of an OBN survey and with understood notation for the geometrical quantities, consider the following definitions:

$$h = \sqrt{(r_x - s_x)^2 + (r_y - s_y)^2}$$

$$l = \sqrt{h^2 + (r_z - s_z)^2}$$

$$\cos(\theta) = \frac{r_z - s_z}{\sqrt{h^2 + (r_z - s_z)^2}}$$

A parameterization for $p_m$ can be as follows:

$$p_m(z, \; t) = p_r(z) + p_0 \quad 0 \le z \le z_0$$

$$p_m(z) = p_r(z) + p_1 \quad z_0 < z \le r_z$$

where $z_0$ is the minimum depth at which the water slowness does not vary with calendar time, $p_0$ and $p_1$ are constant, where $p_r(z)$ is a time-independent reference slowness, which is assumed to be known or estimated via one or more other means.

As an example, an x vector in an over-determined system can contain the difference between the initial model and the best fitting (e.g. in a least square sense) model. With this parameterization, the partial derivatives in the system are (assuming that the variation of the water slowness at each acquisition does not change spatially):

$$\frac{\partial T_m}{\partial r_x} = \frac{r_x - s_x}{l(r_z - s_z)}T_v$$

$$\frac{\partial T_m}{\partial r_y} = \frac{r_y - s_y}{l(r_z - s_z)}T_v$$

$$\frac{\partial T_m}{\partial r_z} = \frac{1}{\cos(\theta)}p_r(z_0) + \left(\frac{1}{l} - \frac{l}{(r_z - s_z)^2}\right)T_v$$

$$\frac{\partial T_m}{\partial c_0} = 1$$

$$\frac{\partial T_m}{\partial c_1} = t_i$$

$$\frac{\partial T_m}{\partial c_2} = t_i^2$$

$$\frac{\partial T_m}{\partial p_0} = \frac{1}{\cos(\theta)}(\min(z_0, r_z) - s_z)$$

$$\frac{\partial T_m}{\partial p_1} = \frac{1}{\cos(\theta)}(r_z - \min(z_0, r_z))$$

Above, the partial derivatives of the modeled traveltimes with respect to the receiver positions depend on the acquisition geometry and vertical traveltimes. The partial derivatives with respect to the parameters that model the slowness perturbations ($p_0$, $p_1$) do depend on the geometry. The partial derivatives with respect to $c_1$ and $z_2$ depend on the receiver and on the acquisition time but do not depend on the shot that created that traveltime. This is obvious since the clock drift for a receiver does not depend on the source signature but only on the time that source was activated. The partial derivative with respect to $c_0$ is zero for a receiver except the receiver whose traveltime it corresponds to. In the latter case, its value is one. As it is a binary value, an attempt to estimate it may lead to several rows that are linear combinations and therefore reduce the rank of both matrices A and PA. This can be understood where an inversion is performed for the clock drift parameters alone. In this case, the length of the vector x is equal to three times the number of receivers.

Figure 19:
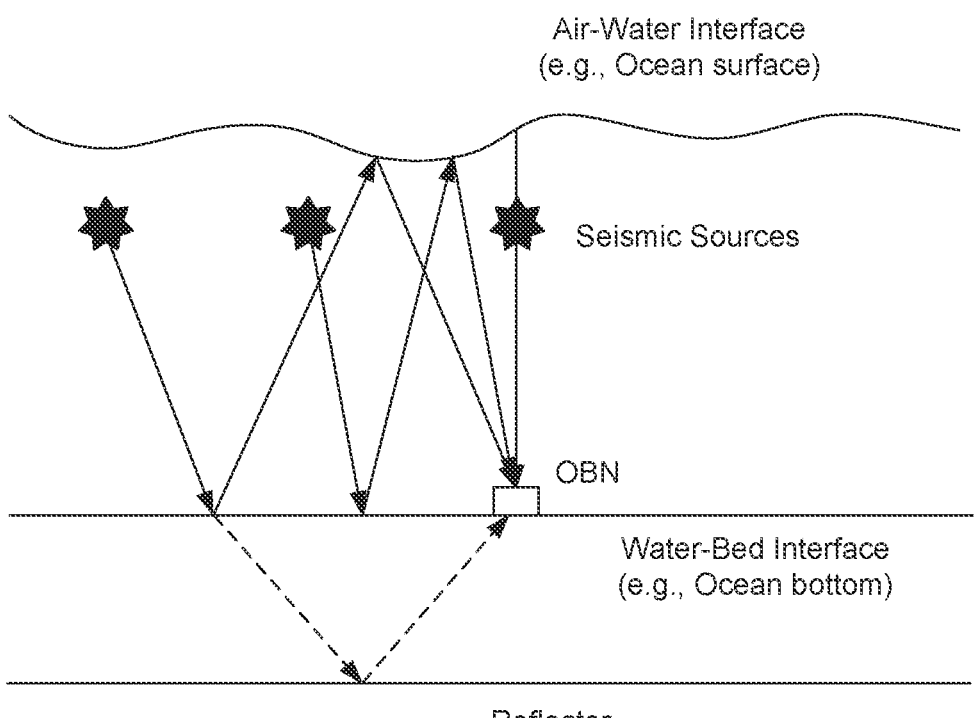
FIG. 19 illustrates an example diagram with rays.

FIG. 19 shows a diagram 1900 of some examples of rays with respect to seismic sources and an OBN where rays from two of the seismic sources are reflected at the air-water interface (e.g., ocean surface) and the water-bed interface (e.g., ocean bottom) prior to arriving at the OBN and where a ray from one of the seismic sources arrives directly at the OBN. As indicated in the example of FIG. 19, traveltimes for multiples differ from those of direct arrivals. The diagram 1900 also shows rays as penetrating a formation and reflecting off a reflector in the formation where energy can then arrive at the OBN. Multiples may exist between an air-water interface and a water-bed interface (e.g., water-formation interface) and/or between interfaces of a formation. Where streamers with receivers are towed below an air-water interface, ghosts may be recorded, which are a type of multiple. A ghost can be defined as a short-path multiple, or a spurious reflection that occurs when seismic energy initially reverberates upward from a shallow subsurface and then is reflected downward, such as at the base of weathering or between sources and receivers and the sea surface. As shown in the diagram 1900 of FIG. 19, the multiples are generated in part by the water-bed interface and the air-water interface.

A first order water layer multiple is a seismic wave that follows a path from a source down to a seabed where it is then reflected upwards. Such a wave can then be further reflected downwards again at the sea surface towards the seabed, where it may be recorded by an OBN.

The traveltime for a substantially flat seabed may be given as:

$$M_{sr} = \frac{\sqrt{(x_s - x_r)^2 + (y_s - y_r)^2 + (z_s - 3 \times z_r)^2}}{v(z, t_s)} + C_r(t_s).$$

Similar to the direct wave arrival time, $T_{sr}$, traveltime of the multiple, $M_{sr}$, can be inverted for changes in the model parameters x.

$$x = [dx_r, dy_r, dz_r, dc_{0,r}, dc_{1,r}, dc_{2,r}, dv(t_s), ds_i, ds_t, dz_s],$$

Using a similar system of linear equations:

$$\sum_{i=1:n}^{n} \frac{\partial T_{sr}}{\partial x_i} dx_i = [M'_{sr} - M_{sr}].$$

This set of linear equations can be added to an original set of equations, which may be represented as:

$$Ax = b.$$

Some practical issues can arise when using traveltimes of multiples. For example, in shallow water, it is in general not possible to pick the traveltime of a multiple with sufficient accuracy as it interferes with other seismic events. In deep water (e.g., where the water depth is over 100 m), it can be possible to pick the arrival time of the first order water layer multiple. When the seafloor is flat $M_{sr}$ can be picked and used with offsets up-to the maximum offset of the direct wave.

As an example, for nodes on a dipping seafloor, a usable offset can be limited to less than the water depth and may be further limited such that the nearest offsets, close to zero offset are included.

As an example, a method can include assessing a seafloor (e.g., a water bed) for a region that is sufficiently flat (e.g., less than 5 degrees of dip). In such an example, the method can utilize the region for purposes of multiple analysis. As an example, a theoretical ideal condition may be that the air-water interface and the water-bed interface are parallel. Such a condition can depend on conditions such as waves, swells, weather, etc. As explained, a method can analyze a survey region for purposes of identifying one or more regions that may meet one or more criteria (e.g., as to flatness, etc.).

The clock drift function $C_r(t_s)$ may include a survey wide constant time shift $c_{00}$ that is equal to the sum of the individual node offsets:

$$c_{00} = \frac{1}{M} \sum_{m=1}^{M} c_{0,m}$$

$c_{00}$ is derived from the inverted clock drift function, $C_r$, or it may be added as a separate inversion parameters.

FIG. 20 shows an example of a method 2000 that includes a reception block 2004 for receiving seismic survey data of a subsurface environment from a seismic survey utilizing water bed receivers, where each of the receivers includes a clock; an assessment block 2008 for assessing one or more clock calibration criteria; a selection block 2012 for, based on the assessing, selecting a clock drift processor for processing at least a portion of the seismic survey data from a plurality of different clock drift processors; an inversion block 2016 for, using at least the clock drift processor, performing a simultaneous inversion for values of model-based parameters; and a generation block 2020 for, using at least a portion of the values, generating processed seismic survey data that represents one or more geological interfaces in the subsurface environment.

The method 2000 is shown in FIG. 20 in association with various computer-readable media (CRM) blocks 2005, 2009, 2013, 2017 and 2021. Such blocks generally include instructions suitable for execution by one or more processors (or cores) to instruct a computing device or system to perform one or more actions. While various blocks are shown, a single medium may be configured with instructions to allow for, at least in part, performance of various actions of the method 2000. A computer-readable medium (CRM) may be a computer-readable storage medium that is not a carrier wave, that is not a signal and that is non-transitory. The blocks may be provided as instructions such as the instructions 380 of the system 360 of FIG. 3.

As an example, the method 2000 can improve processing of seismic data for generating one or more models of a subsurface region of the Earth, which may be a stratigraphic model, a simulation model, etc., which can be utilized for one or more operations (e.g., fluid flow determinations, drilling, etc.).

Figure 21:
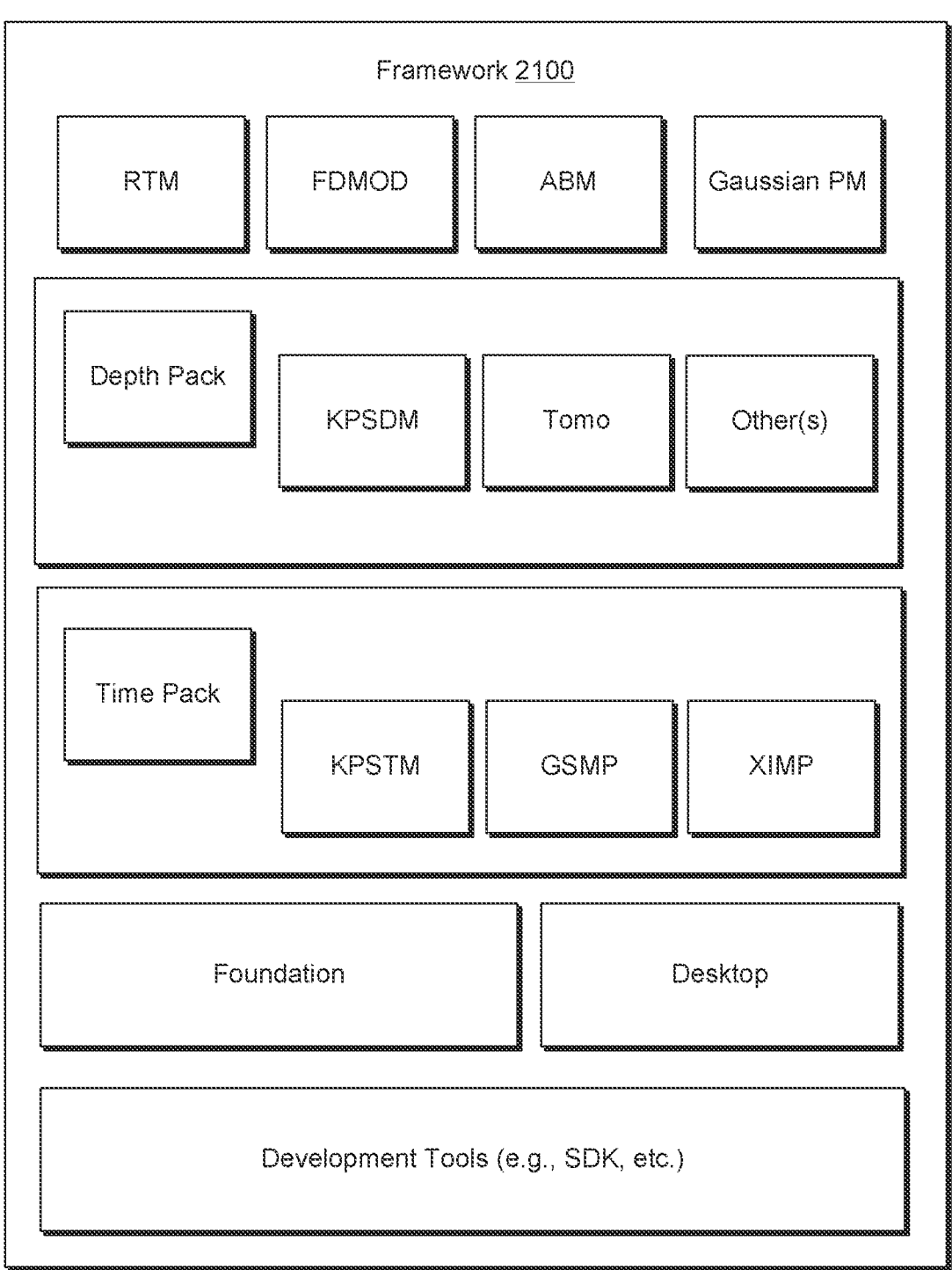
FIG. 21 illustrates an example of a computational framework.

FIG. 21 shows an example of a computational framework 2100 that can include one or more processors and memory, as well as, for example, one or more interfaces. The blocks of the computational framework 2100 may be provided as instructions such as the instructions 380 of the system 360 of FIG. 3. The computational framework of FIG. 21 can include one or more features of the OMEGA framework (Schlumberger Limited, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 21, the computational framework 2100 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 2100 can include features for geophysics data processing. The framework 2100 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 2100 can allow for transforming seismic, electromagnetic, microseismic, and/or vertical seismic profile (VSP) data into actionable information, for example, to perform one or more actions in the field for purposes of resource production, etc. The framework 2100 can extend workflows into reservoir characterization and earth modelling. For example, the framework 2100 can extend geophysics data processing into reservoir modelling by integrating with the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 2100 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

As an example, the framework 2100 can include one or more sets of instructions executable to perform one or more methods such as, for example, one or more of the methods that may be performed by the system 600.

As an example, a method can include receiving seismic survey data of a subsurface environment from a seismic survey utilizing water bed receivers, where each of the receivers includes a clock; assessing one or more clock calibration criteria; based on the assessing, selecting a clock drift processor for processing at least a portion of the seismic survey data from a plurality of different clock drift processors; using at least the clock drift processor, performing a simultaneous inversion for values of model-based parameters; and, using at least a portion of the values, generating processed seismic survey data that represents one or more geological interfaces in the subsurface environment. In such an example, the receivers can include ocean bottom nodes and/or ocean bottom cables, for example, which can be placed on a bed of a body of water.

As an example, model-based parameters can include a water velocity parameter and a clock parameter and can optionally include one or more of a receiver position parameter and a source position parameter. As an example, model-based parameters can include a water velocity parameter, a clock parameter, a receiver position parameter and a source position parameter.

As an example, an inversion can utilize a coordinate system related to a sailing direction of a vessel that moves one or more seismic sources. In such an example, a model-based receiver position parameter may be defined with respect to a different coordinate system.

As an example, a method can include applying at least one technique that adjusts rank of a matrix of an inversion. For example, such an approach can aim to improve the rank of a matrix.

As an example, a plurality of different clock drift processors can include a clock drift processor that constrains an inversion by deployment time delay with respect to receiver clock calibration at deployment time. As explained, such a time delay may be a pre-acquisition time delay for a pre-acquisition time. As an example, a plurality of different clock drift processors can include a clock drift processor that constrains an inversion by deployment time delay and retrieval time delay with respect to receiver clock calibration at deployment time and with respect to receiver clock calibration at retrieval time. As explained, a retrieval time delay may be a post-acquisition time delay for a post-acquisition time.

As an example, a plurality of different clock drift processors can include a clock drift processor that utilizes a linear clock drift adjustment.

As an example, one or more clock calibration criteria can include at least one of a deployment criterion and a retrieval criterion, which may be at least one of a pre-acquisition criterion and a post-acquisition criterion.

As an example, a water bed can be at a depth below an air-water interface greater than approximately 100 meters. As explained, a water bed can be a water-formation interface. As explained, one or more types of receivers can be positioned on a water bed and be referred to as water bed receivers.

As an example, a method can include utilizing position data for receivers where, for example, the position data can include GPS position data.

As an example, values of model-based parameters can include at least one of lateral and vertical position of a receiver, lateral and vertical position of groups of seismic sources, clock drift of each receiver and temporal changes in acoustic velocity of water between a seismic source and a receiver.

As an example, an inversion can be a linearized inversion of traveltime of direct wave between a source and receivers (e.g., water bed receivers).

As an example, a system can include a processor; memory operatively coupled to the processor; and processor-executable instructions stored in the memory to instruct the system to: receive seismic survey data of a subsurface environment from a seismic survey utilizing water bed receivers, where each of the receivers includes a clock; perform an assessment of one or more clock calibration criteria; based on the assessment, select a clock drift processor for processing at least a portion of the seismic survey data from a plurality of different clock drift processors; using at least the clock drift processor, perform a simultaneous inversion for values of model-based parameters; and, using at least a portion of the values, generate processed seismic survey data that represents one or more geological interfaces in the subsurface environment.

As an example, one or more computer-readable storage media can include computer-executable instructions executable to instruct a computing system to: receive seismic survey data of a subsurface environment from a seismic survey utilizing water bed receivers, where each of the receivers includes a clock; perform an assessment of one or more clock calibration criteria; based on the assessment, select a clock drift processor for processing at least a portion of the seismic survey data from a plurality of different clock drift processors; using at least the clock drift processor, perform a simultaneous inversion for values of model-based parameters; and, using at least a portion of the values, generate processed seismic survey data that represents one or more geological interfaces in the subsurface environment.

As an example, a method can include receiving seismic survey data of a subsurface environment from a seismic survey utilizing receivers, where each of the receivers includes a clock; assessing one or more clock calibration criteria; based on the assessing, selecting a clock drift processor for processing at least a portion of the seismic survey data from a plurality of different clock drift processors; and, using at least the clock drift processor, generating processed seismic survey data that represents one or more geological interfaces in the subsurface environment. In such an example, the receivers can be ocean bottom nodes (OBNs).

As an example, a method can include performing an inversion for seismic source parameters. For example, consider an inversion that utilizes a coordinate system related to a sailing direction of a vessel that moves one or more seismic sources. In such an example, node position parameters can be defined with respect to a different coordinate system.

As an example, a method can include applying at least one technique that makes a matrix of an inversion more fully ranked.

As an example, a method can include selecting from a plurality of different clock drift processors where a clock drift processor is included for one or more of an inversion constrained by deployment time delay with respect to node clock calibration at deployment time and an inversion constrained by deployment time delay and retrieval time delay with respect to node clock calibration at deployment time and with respect to node clock calibration at retrieval time. As an example, a plurality of different clock drift processors can include a clock drift processor for an inversion that utilizes linear clock drift adjustment.

As an example, clock calibration criteria can include at least one of a deployment criterion and a retrieval criterion. As an example, receivers can be disposed on a subsea surface (e.g., as included in nodes that rest on the subsea surface). In such an example, the subsea surface may be at a depth below an air/water interface greater than approximately 100 meters. For example, consider a depth greater than approximately 1000 meters, which may be considered to be deep.

As an example, a method can include utilizing position data for the receivers. For example, consider position data that are or include GPS position data.

As an example, seismic survey data may be organized with respect to inline and crossline directions. As an example, a vessel may tow a source or sources with respect to an inline and/or a crossline direction.

As an example, a method can include performing a joint inversion.

As an example, a method can include estimating parameter values for at least one of lateral and vertical position of a receiver, lateral and vertical position of groups of seismic sources, clock drift of each receiver and temporal changes in acoustic velocity of water between a seismic source and a receiver. In such an example, the estimating can include performing a linearized inversion of traveltime of direct wave between seismic sources and seismic receivers.

As an example, a system can include a processor; memory operatively coupled to the processor; and processor-executable instructions stored in the memory to instruct the system to: receive seismic survey data of a subsurface environment from a seismic survey utilizing receivers, where each of the receivers includes a clock; assess one or more clock calibration criteria; based on an assessment, select a clock drift processor for processing at least a portion of the seismic survey data from a plurality of different clock drift processors; and using at least the clock drift processor, generate processed seismic survey data that represents one or more geological interfaces in the subsurface environment.

As an example, one or more computer-readable storage media can include computer-executable instructions executable to instruct a computing system to: receive seismic survey data of a subsurface environment from a seismic survey utilizing receivers, where each of the receivers include a clock; assess one or more clock calibration criteria; based on an assessment, select a clock drift processor for processing at least a portion of the seismic survey data from a plurality of different clock drift processors; and using at least the clock drift processor, generate processed seismic survey data that represents one or more geological interfaces in the subsurface environment.

As an example, a computer program product can include computer-executable instructions to instruct a computing system to perform a method, for example, consider a method such as the method 800 of FIG. 8, the method 1400 of FIG. 14, the method 1500 of FIG. 15, the method 2000 of FIG. 20, etc.

FIG. 22 shows components of a computing system 2200 and a networked system 2210 that includes a network 2220. The system 2200 includes one or more processors 2202, memory and/or storage components 2204, one or more input and/or output devices 2206 and a bus 2208. Instructions may be stored in one or more computer-readable media (memory/storage components 2204). Such instructions may be read by one or more processors (see the processor(s) 2202) via a communication bus (see the bus 2208), which may be wired or wireless. The one or more processors may execute such instructions to implement (wholly or in part) one or more attributes (as part of a method). A user may view output from and interact with a process via an I/O device (see the device 2206). A computer-readable medium may be a storage component such as a physical memory storage device such as a chip, a chip on a package, a memory card, etc. (a computer-readable storage medium).

Components may be distributed, such as in the network system 2210. The network system 2210 includes components 2222-1, 2222-2, 2222-3, . . . 2222-N. The components 2222-1 may include the processor(s) 2202 while the component(s) 2222-3 may include memory accessible by the processor(s) 2202. Further, the component(s) 2222-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Information may be input from a display (consider a touchscreen), output to a display or both. Information may be output to a projector, a laser device, a printer, etc. such that the information may be viewed. Information may be output stereographically or holographically. As to a printer, consider a 2D or a 3D printer. A 3D printer may include one or more substances that can be output to construct a 3D object. Data may be provided to a 3D printer to construct a 3D representation of a subterranean formation. Layers may be constructed in 3D (horizons, etc.), geobodies constructed in 3D, etc. Holes, fractures, etc., may be constructed in 3D (as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

REFERENCES (DOCUMENTS INCORPORATED BY REFERENCE HEREIN)

Amini, A., Peng, H., Zhang, Z., Huang, R., and Yang, J. Joint inversion of water velocity and node position for ocean-bottom node data. 86th Annual International Meeting, SEG, Expanded Abstracts, 5490-5494.

Advocate, D. M., and K. C. Hood, 1993, An empirical time-depth model for calculating water depth northwest Gulf of Mexico: Geo-Marine Letters, 13, 207-211

Bagaini, C., 2005, Performance of time delay estimators, Geophysics Jul. 7, 2005, Vol.70, V109-V120

Beaudoin, G. J., M. D. Reasnor, M. Phfister, G. Openshaw, 2010. First wide-azimuth timelapse seismic acquisition using ocean bottom seismic nodes at Atlantis field—Gulf of Mexico, EAGE 2010, B029

Docherty, P., and Hays, D. Ambiguities in direct arrival time inversion of ocean bottom nodes: 74th EAGE Conference & Exhibition, Extended Abstracts.

MacKay, S., J. Fried, and C. Carvill, (2003), "The impact of water-velocity variations on deepwater seismic data," The Leading Edge 22: 344-350. https://doi.org/10.1190/1.1572088

Moore, I., 2008, Water velocity corrections, U.S. Pat. No. 7,450,469

Paige, C. C., and Saunders, M. A., 1982, LSQR: An algorithm for sparse linear equations and sparse least squares: ACM Trans. Math. Software, 8, 43-71.

Olofsson, B. and Woje, G., Ensuring correct clock timing in ocean bottom node acquisition. 80th Annual International Meeting, SEG, Expanded Abstracts, 172-176.

Oshida, A., Kubota, R., Nishiyama, E., Ando, J., Kasahara, J., Nishizawa, A., and Kaneda, K. A new method for determining OBS positions for crustal structure studies, using airgun shots and precise bathymetric data. Exploration Geophysics, 39:1, 15-25, DO I: 10.1071/EG08005

Udengaard, C., Craft, K., 2012, Analysis of Water Column Complexity in OBN Data: 74th EAGE Conference & Exhibition.

VanDecar, J. C. and Crosson, R. S., 1990, Determination of teleseismic relative phase arrival times using multichannel cross-correlation and least squares, Bulletin of the Seismological Society of America, 80, 150-169.

What is claimed is:

1. A method comprising:

receiving seismic survey data of a subsurface environment from a seismic survey utilizing water bed receivers located at a plurality of nodes located in a baseline grid, wherein each of the water bed receivers comprises a clock;

assessing which of a plurality of clock calibration criteria the seismic survey data meets, the plurality of clock calibration criteria including:

a first clock calibration criteria including whether clock drift correction has been applied using sync values at a deployment time and a retrieval time;

a second clock calibration criteria including whether a clock sync at the deployment time is available; and a third clock calibration criteria including whether the clock sync is available at the retrieval time;

responsive to which of the plurality of clock calibration criteria is met, selecting a clock drift processor for processing at least a portion of the seismic survey data from a plurality of different clock drift processors;

using at least the clock drift processor, performing a simultaneous inversion for values of model-based parameters; and using at least a portion of the values and the baseline grid, generating processed seismic survey data that represents one or more geological interfaces in the subsurface environment.

2. The method of claim 1, wherein the model-based parameters comprise a water velocity parameter and a clock parameter.

3. The method of claim 1, wherein the model-based parameters comprise a water velocity parameter, a clock parameter, a receiver position parameter and a source position parameter.

4. The method of claim 1, wherein the simultaneous inversion utilizes a coordinate system related to a sailing direction of a vessel that moves one or more seismic sources.

5. The method of claim 1, comprising applying at least one technique that adjusts rank of a matrix of the simultaneous inversion.

6. The method of claim 1, wherein the plurality of different clock drift processors comprise a deployment clock drift processor that constrains the simultaneous inversion by deployment time delay with respect to receiver clock calibration at the deployment time.

7. The method of claim 1, wherein the plurality of different clock drift processors comprise a deployment and retrieval clock drift processor that constrains the simultaneous inversion by deployment time delay and retrieval time delay with respect to receiver clock calibration at the deployment time and with respect to the receiver clock calibration at the retrieval time.

8. The method of claim 1, wherein the plurality of different clock drift processors comprise a linear clock drift processor that utilizes a linear clock drift adjustment.

9. The method of claim 1, wherein a water bed of the water bed receivers is at a depth below an air-water interface greater than approximately 100 meters.

10. The method of claim 1, wherein the values comprise at least one of lateral and vertical position of the water bed receivers, lateral and vertical position of groups of seismic sources, clock drift of each receiver or temporal changes in acoustic velocity of water between a seismic source and a receiver.

11. The method of claim 1, wherein the simultaneous inversion comprises a linearized inversion of traveltime of direct wave between a source and the water bed receivers.

12. A system comprising:

a processor;

memory operatively coupled to the processor; and processor-executable instructions stored in the memory to instruct the system to:

receive seismic survey data of a subsurface environment from a seismic survey utilizing water bed receivers located at a plurality of nodes located in a baseline grid, wherein each of the water bed receivers comprises a clock;

assess which of a plurality of clock calibration criteria the seismic survey data meets, the plurality of clock calibration criteria including:

a first clock calibration criteria including whether clock drift correction has been applied using sync values at a deployment time and a retrieval time;

a second clock calibration criteria including whether a clock sync at the deployment time is available; and a third clock calibration criteria including whether the clock sync is available at the retrieval time;

responsive to which of the plurality of clock calibration criteria is met, select a clock drift processor for processing at least a portion of the seismic survey data from a plurality of different clock drift processors;

using at least the clock drift processor, perform a simultaneous inversion for values of model-based parameters; and using at least a portion of the values and the baseline grid, generate processed seismic survey data that represents one or more geological interfaces in the subsurface environment.

13. The method of claim 1, wherein the water bed receivers comprise ocean bottom cables.

14. The method of claim 2, wherein the model-based parameters comprise a receiver position parameter.

15. The method of claim 2, wherein the model-based parameters comprise a source position parameter.

16. The method of claim 1, wherein a model-based receiver position parameter is defined with respect to a different coordinate system.

17. One or more non-transitory computer-readable storage media comprising computer-executable instructions executable to instruct a computing system to:

receive 4-dimensional seismic survey data of a subsurface environment from a seismic survey utilizing water bed receivers located at a plurality of nodes located in a baseline grid, wherein each of the water bed receivers comprises a clock, wherein the 4-dimensional seismic survey data includes a plurality of 3-dimensional seismic data sets collected over time;

assess, for each of the plurality of 3-dimensional seismic data sets, which of a plurality of clock calibration criteria the plurality of 3-dimensional seismic data sets meets, the plurality of clock calibration criteria including:

a first clock calibration criteria including whether clock drift correction has been applied using sync values at a deployment time and a retrieval time;

a second clock calibration criteria including whether a clock sync at the deployment time is available; and a third clock calibration criteria including whether the clock sync is available at the retrieval time;

responsive to which of the plurality of clock calibration criteria is met, select, from a plurality of different clock drift processors, a clock drift processor for processing at least a portion of each 3-dimensional seismic data sets of the plurality of 3-dimensional seismic data sets;

using at least the clock drift processor, perform, for each 3-dimensional seismic data sets of the plurality of 3-dimensional seismic data sets, a simultaneous inversion for values of model-based parameters; and using at least a portion of the values and the baseline grid, generate time-lapse seismic survey data that represents changes with respect to time of one or more geological interfaces in the subsurface environment.

18. The method of claim 1, wherein the seismic survey data includes first seismic survey data collected at a first time, and further comprising, at a second time when the water bed receivers at the plurality of nodes are located in a new grid, and responsive to the processed seismic survey data, repositioning the plurality of nodes to the baseline grid.

19. The method of claim 1, wherein:

the seismic survey data includes 4-dimensional seismic survey data, the 4-dimensional seismic survey data including a plurality of 3-dimensional seismic data sets collected over time, assessing which of the plurality of clock calibration criteria the seismic data meets includes assessing which of the plurality of clock calibration criteria each 3-dimensional data set of the plurality of 3-dimensional data sets meets, selecting the clock drift processor includes selecting the clock drift processor for each 3-dimensional data set of the plurality of 3-dimensional data sets, performing the simultaneous inversion includes performing the simultaneous inversion for each 3-dimensional data set of the plurality of 3-dimensional data sets, and generating the processed seismic survey data includes generating time-lapse seismic survey data, the time-lapse seismic survey data including changes in the subsurface environment with respect to time.

\* \* \* \* \*